United States Patent
Nishibata

(10) Patent No.: US 9,325,274 B2
(45) Date of Patent: Apr. 26, 2016

(54) APPARATUS FOR CARRYING OUT IMPROVED CONTROL OF ROTARY MACHINE

(71) Applicant: DENSO CORPORATION, Kariya, Aichi-pref. (JP)

(72) Inventor: Koichi Nishibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/330,393

(22) Filed: Jul. 14, 2014

(65) Prior Publication Data
US 2015/0015171 A1    Jan. 15, 2015

(30) Foreign Application Priority Data
Jul. 12, 2013    (JP) .................................. 2013-146992

(51) Int. Cl.
| | | |
|---|---|---|
| H02P 6/12 | (2006.01) | |
| B23Q 35/00 | (2006.01) | |
| H02P 29/00 | (2016.01) | |
| H02P 21/14 | (2016.01) | |
| H02M 7/5387 | (2007.01) | |

(52) U.S. Cl.
CPC ............ H02P 29/0038 (2013.01); H02P 21/14 (2013.01); H02M 7/53875 (2013.01)

(58) Field of Classification Search
CPC ....... H02P 6/10; H02P 6/002; H02P 29/0038; H02P 21/14; H01M 7/53875

USPC ............. 318/400.15, 400.23, 400.17, 400.01, 318/700, 162
See application file for complete search history.

(56) References Cited

U.S. PATENT DOCUMENTS

| | | | |
|---|---|---|---|
| 6,906,503 B2 * | 6/2005 | Lopez-Santillana et al. | . 323/283 |
| 7,872,435 B2 * | 1/2011 | Imai et al. | ...................... 318/599 |
| 8,193,743 B2 * | 6/2012 | Yamada | ............ H02M 7/53875 318/162 |
| 2003/0075997 A1 * | 4/2003 | Keim et al. | .................. 310/68 D |
| 2012/0173066 A1 * | 7/2012 | Yamada et al. | .................. 701/22 |

FOREIGN PATENT DOCUMENTS

JP    2001-078495    3/2001

* cited by examiner

*Primary Examiner* — Bentsu Ro
*Assistant Examiner* — Zemenay Truneh
(74) *Attorney, Agent, or Firm* — Nixon & Vanderhye P.C.

(57) ABSTRACT

In an apparatus for controlling a variable of a rotary machine based on an AC voltage supplied to the rotary machine via a switching element of a power converter, a generator generates a drive signal including an on-off pattern of the switching element. A driver drives, based on the on-off pattern of the drive signal, the switching element. A parameter monitor monitors a parameter indicative of change of a harmonic current flowing in the rotary machine based on a harmonic voltage included in the AC voltage. A limiter limits, based on the parameter monitored by the parameter detector, generation of the drive signal by the generator to limit an increase of a level of the harmonic current.

18 Claims, 14 Drawing Sheets

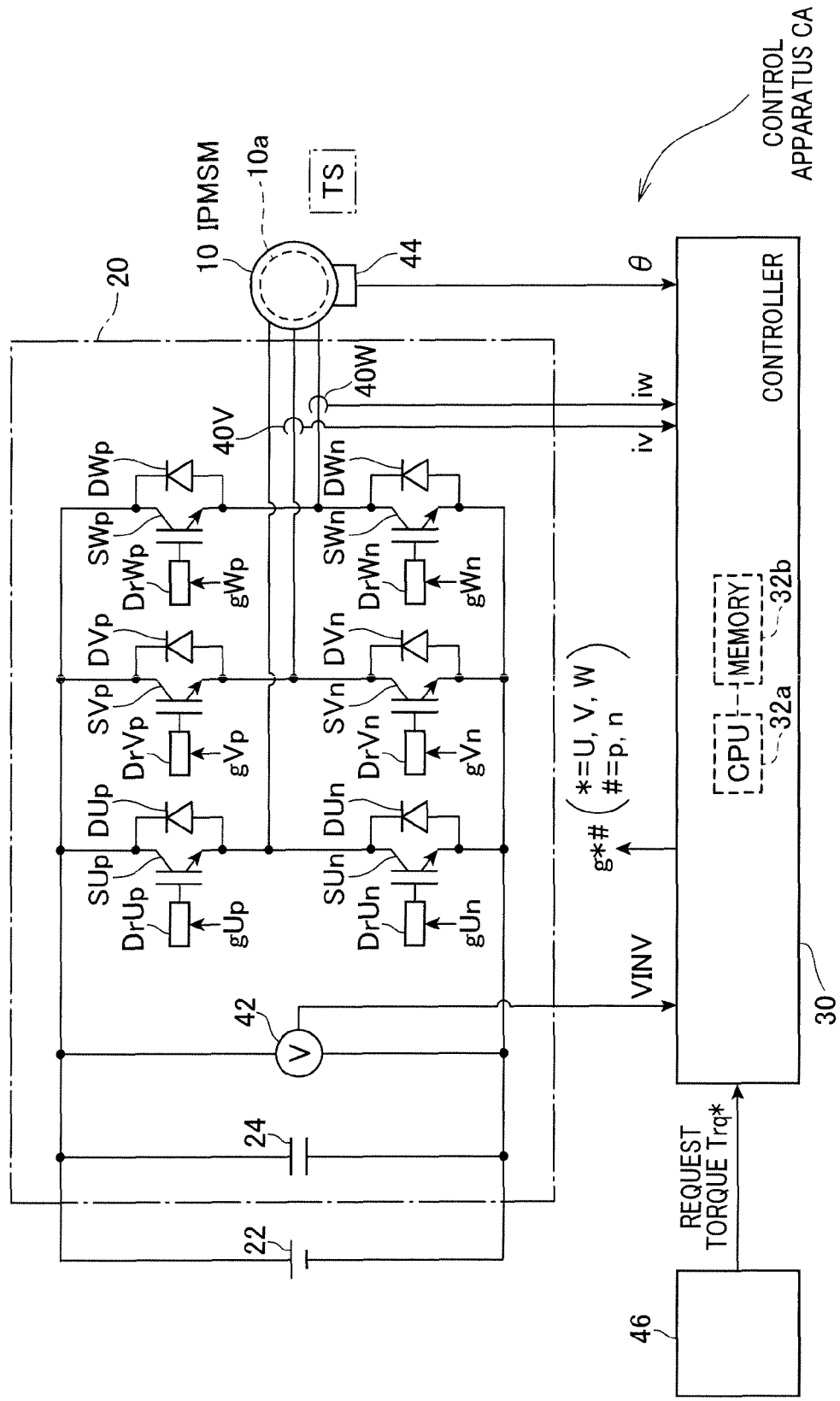

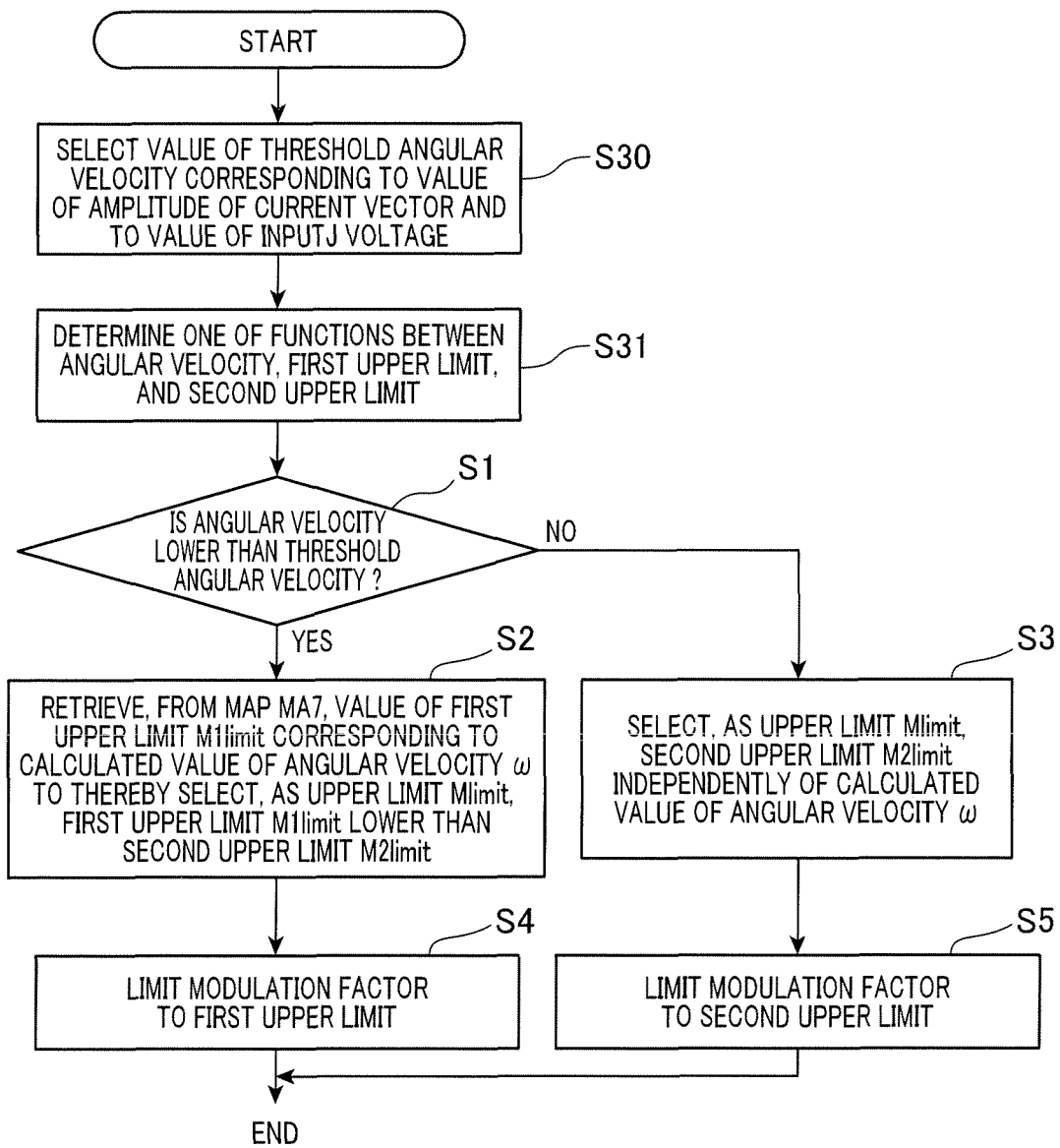

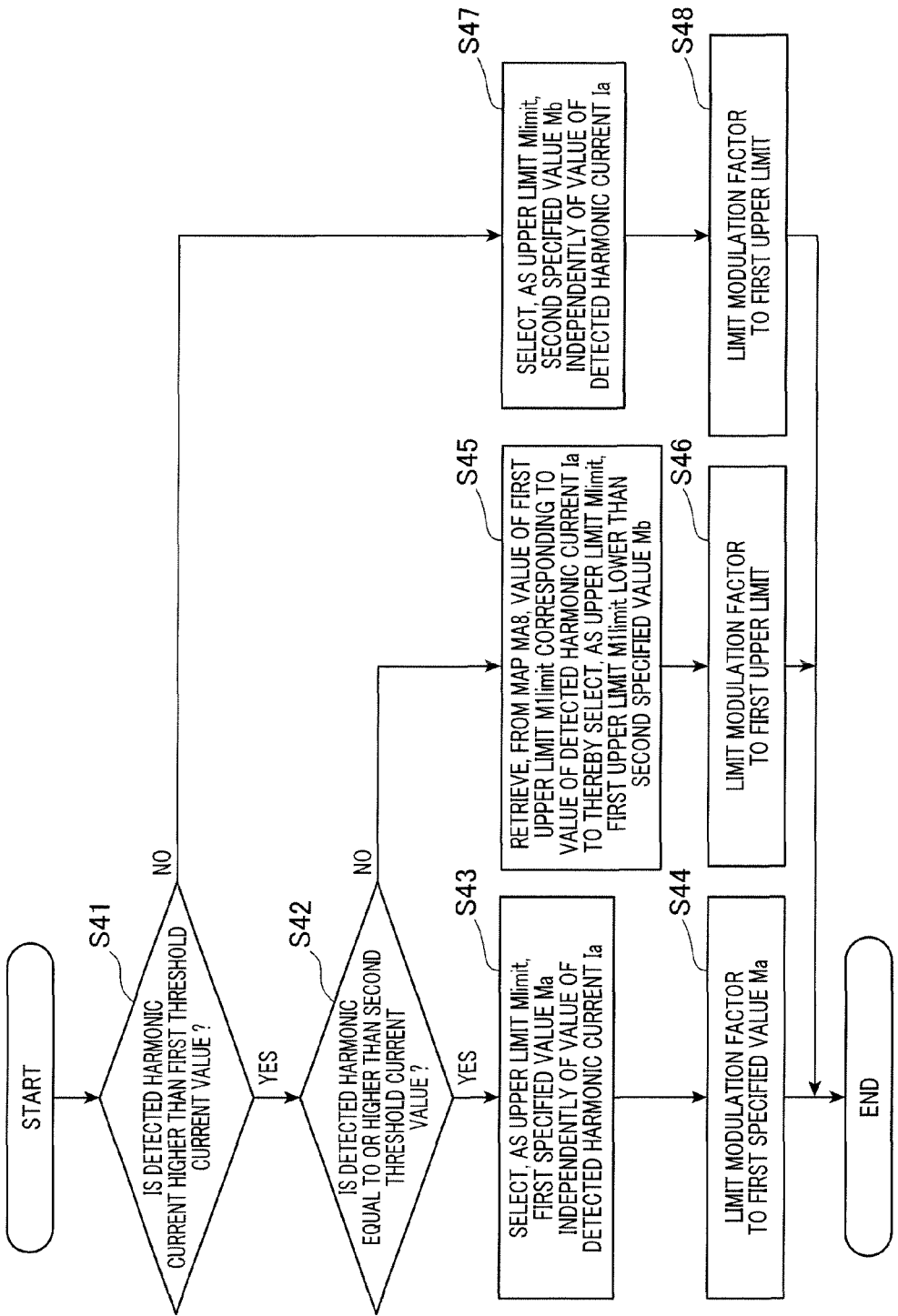

APPARATUS FOR CARRYING OUT IMPROVED CONTROL OF ROTARY MACHINE

CROSS REFERENCE TO RELATED APPLICATIONS

This application is based on and claims the benefit of priority from Japanese Patent Application 2013-146992 filed on Jul. 12, 2013, the disclosure of which is incorporated in its entirety herein by reference.

TECHNICAL FIELD

The present disclosure relates to apparatuses for controlling a rotary machine.

BACKGROUND

Rotary machines, such as motors, are operative to output, based on controlled AC (Alternating Current) power generated from DC (Direct Current) power supplied from a power source, torque, power, or the like. Control system are used to generate controlled AC power based on input DC power supplied from the power source.

Specifically, these control systems include an inverter and a controller. The controller controls switching elements of the inverter to convert a DC voltage supplied from a DC power source to a controlled AC voltage, thus supplying the controlled AC voltage to an AC motor as an example of rotary machines.

The controller of a normal type of these control systems operates in a sinusoidal control mode that converts a DC voltage input to the inverter to a sinusoidal AC voltage according to a switching frequency sufficiently higher than a drive frequency of the AC motor. This supplies a pseudo sinusoidal AC voltage to the AC motor without including harmonic voltage components.

Japanese Patent Application Publication No. 2001-78495 discloses another type of these control systems.

Specifically, the control system disclosed in the Patent Publication operates in a rectangular-control mode, i.e. single-pulse control mode, which controls the switching elements of the inverter using a relatively lower switching frequency as compared with that used in the sinusoidal control mode to convert the DC voltage to a rectangular AC voltage to be supplied to the AC motor. This increases a voltage utilization factor of the control system as compared with a control system for converting the DC voltage to a sinusoidal AC voltage. Note that the voltage utilization factor means the ratio of the magnitude of the inverter output voltage to that of the inverter input DC voltage.

In addition, another control system operates in an over-modulation control mode. The over-modulation control mode controls the switching elements of the inverter using a relatively lower switching frequency as compared with that used in the sinusoidal control mode. This converts the DC voltage input to the inverter to an AC voltage such that the amplitude of a fundamental component of the AC voltage is higher than the DC voltage within an over-modulation range of the inverter. This also increases the voltage utilization factor of the control system as compared with a control system for converting the DC voltage to a sinusoidal AC voltage.

SUMMARY

The rectangular-control mode or the over-modulation control mode increases the voltage utilization factor of a control system as compared with a control system for converting an input DC voltage to a sinusoidal AC voltage.

However, each of the rectangular-control mode and the over-modulation control mode controls the switching elements of the inverter using a relatively lower switching frequency as compared with that used in the sinusoidal control mode. This may cause harmonic voltage components to be supplied to a rotary machine. The harmonic voltage components applied to the rotary machine may cause high-level harmonic currents to flow in the rotary machine. This may result in reduction of the ability of the control system to control the rotary machine due to the high-level harmonic currents.

In view of the circumstances set forth above, one aspect of the present disclosure seeks to provide apparatuses for controlling a rotary machine, which are designed to address the problem set forth above.

Specifically, an alternative aspect of the present disclosure aims to provide such apparatuses capable of reducing the levels of harmonic currents flowing in the rotary machine, thus improving the ability thereof to control the rotary machine.

According to a first exemplary aspect of the present disclosure, there is provided an apparatus for controlling a variable of a rotary machine based on an AC voltage supplied to the rotary machine via a switching element of a power converter. The apparatus includes a generator that generates a drive signal including an on-off pattern of the switching element, and a driver that drives, based on the on-off pattern of the drive signal, the switching element. The apparatus includes a parameter monitor that monitors a parameter indicative of change of a harmonic current flowing in the rotary machine based on a harmonic voltage included in the AC voltage. The apparatus includes a limiter that limits, based on the parameter monitored by the parameter detector, generation of the drive signal by the generator to limit an increase of a level of the harmonic current.

It is conventionally known that a decrease of a rotational velocity, such as an angular velocity, of the rotor decreases the impedance of the rotary machine against harmonic voltages included in the AC voltage as an output voltage of the power converter; the impedance will be referred to as a harmonic impedance. This might cause an increase of the level of a harmonic current flowing in the rotary machine, resulting in reduction of the ability of controlling the rotary machine.

In order to address such a circumstance, the apparatus includes the parameter monitor that monitors the parameter indicative of change of a harmonic current flowing in the rotary machine based on a harmonic voltage included in the AC voltage. That is, the parameter monitor monitors change of the harmonic current based on change of the parameter.

In addition, the apparatus includes the limiter that limits, based on the parameter monitored by the parameter detector, generation of the drive signal by the generator to limit an increase of the level of the harmonic current. That is, even if the parameter monitored by the parameter detector likely increases due to, for example, reduction of the harmonic impedance, the limiter reliably limits generation of the drive signal by the generator to limit the increase of the level of the harmonic current. This therefore improves the ability of the apparatus for controlling a variable of the rotary machine.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 1 is a circuit diagram of a control apparatus for controlling a motor-generator according to a first embodiment of the present disclosure;

FIG. 5B is a flowchart schematically illustrating a modulation-factor limitation routine to be executed by the controller according to the fourth embodiment;

FIG. 6B is a flowchart schematically illustrating a modulation-factor limitation routine to be executed by the controller according to the fifth embodiment;

DETAILED DESCRIPTION OF EMBODIMENT

Figure 2A:
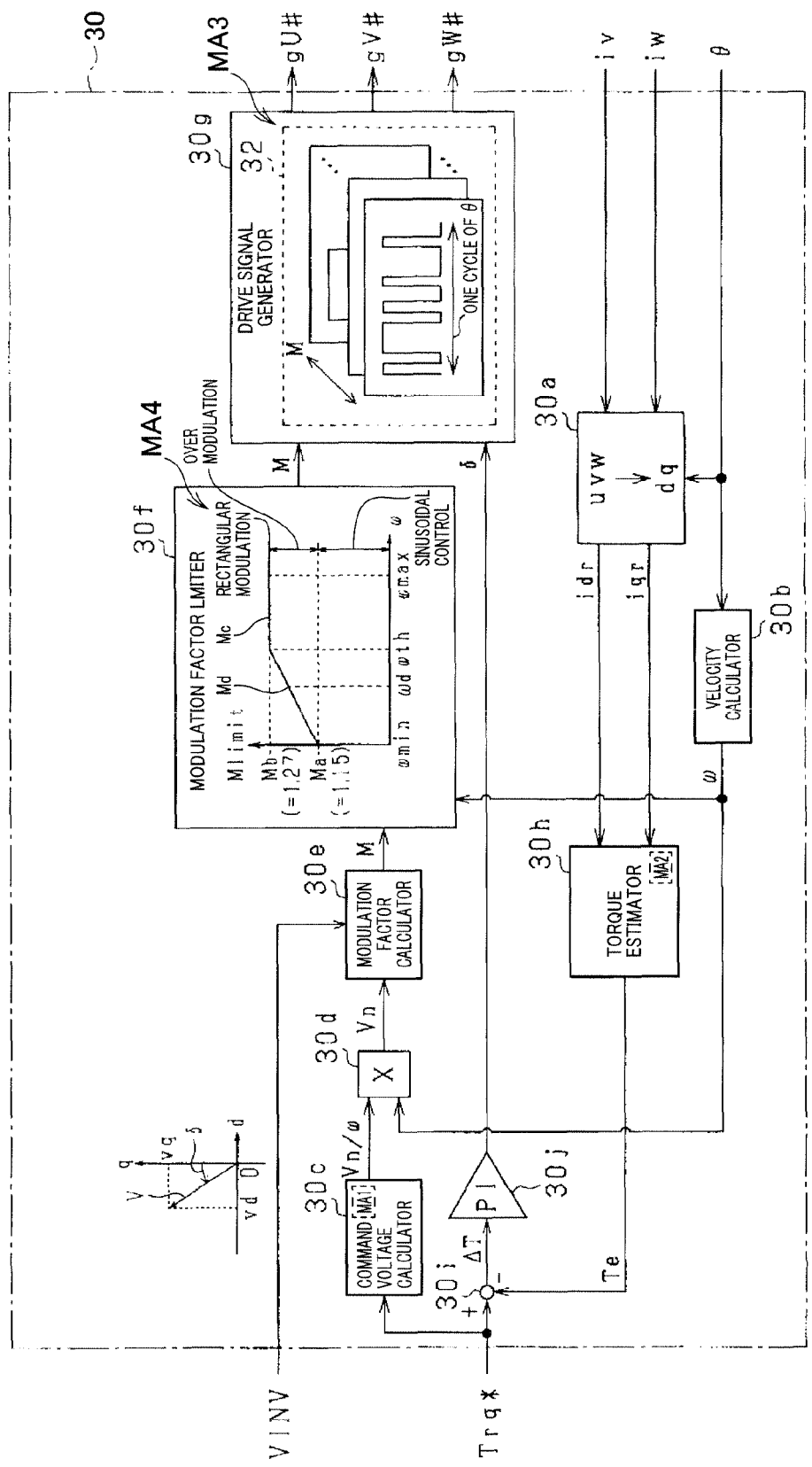
FIG. 2A is a block diagram schematically illustrating an example of the specific structure of a controller of the control apparatus according to the first embodiment.

Embodiments of the present disclosure will be described hereinafter with reference to the accompanying drawings. In the embodiments, like parts between the embodiments, to which like reference characters are assigned, are omitted or simplified to avoid redundant description.

First Embodiment

Referring to FIG. 1, there is illustrated a three-phase motor-generator, referred to simply as "motor-generator" 10 installed in a target vehicle as an example of rotary machines according to the present disclosure. In each of the first embodiment and the following embodiments, a motor having a salient-pole structure is used as the motor-generator 10. For example, an IPMSM (Interior Permanent Magnet Synchronous Motor) is used as the motor-generator 10.

In FIG. 1, there is also illustrated a control system 50. The control system 50 is equipped with an inverter 20 serving as a power converter, a high-voltage battery 22, a smoothing capacitor 24, and a control apparatus CA.

Specifically, the motor-generator 10 and the high-voltage battery 12 can establish electrical connection therebetween via the inverter 20.

For example, the motor-generator 10 is provided with an annular rotor 10a having an iron rotor core and rotatably disposed in the motor-generator 10. Specifically, the iron rotor core is, for example, directly or indirectly coupled to a crankshaft of an engine installed in the target vehicle to be rotatable together with the crankshaft.

The rotor 10a has a salient-pole structure.

Specifically, the rotor core of the rotor 10a is provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor 10a has a direct axis (d-axis) in line with a direction of magnetic flux created by the N pole, in other words, in line with an N-pole center line. The rotor 10a also has a quadrature axis (q-axis) with a phase being $\pi/2$-radian electric angle leading with respect to a corresponding d-axis during rotation of the rotor 10a. In other words, the q-axis is electromagnetically orthogonal to the d-axis.

The d and q axes constitute a d-q coordinate system, i.e. a two-phase rotating coordinate system, defined relative to the rotor 10a of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor 10a.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings, i.e. armature windings, wound in the slots of the stator.

The three-phase windings are wound in the slots such that the U-, V-, and W-phase windings are shifted by an electric angle of, for example, $2\pi/3$ radian in phase from each other.

For example, the three-phase armature windings, i.e. U-, V-, and W-phase windings, each have one end connected to a common junction, i.e. a neutral point, and the other end to a separate terminal in, for example, a star-configuration.

The motor-generator 10 is operative to receive, at the three-phase windings, three-phase currents to thereby generate a rotating magnetic flux; this allows the rotor 10a to turn based on magnetic attractive force between the rotating magnetic flux and a magnetic flux of the rotor 10a.

The high-voltage battery 22 is capable of outputting a voltage equal to or higher than 100 V. The smoothing capacitor 24 is disposed between the high-voltage battery 22 and the inverter 20 in parallel to each pair of the high- and low-side switching elements. The smoothing capacitor 24 is operative to smooth the output voltage from the high-voltage battery 22, and supply the smoothed output voltage to the inverter 20 as input voltage.

The inverter 20 is designed as a three-phase inverter. The inverter 20 is provided with a first pair of series-connected high- and low-side (upper- and lower-arm) switching elements Sup and Sun, a second pair of series-connected high- and low-side switching elements Svp and Svn, and a third pair of series-connected high- and low-side switching elements Swp and Swn. The inverter 20 is also provided with flywheel diodes Dup, Dun, Dvp, Dvn, Dwp, and Dwn electrically connected in antiparallel to the respective switching elements Sup, Sun, Svp, Svn, Swp, and Swn.

In the first embodiment, as the switching elements S*# (*=u, v, and w, and #=p and n), IGBTs are respectively used.

When power MOSFETs are used as the switching elements S*#, intrinsic diodes of the power MOSFETs can be used as the flywheel diodes, thus eliminating the need for external flywheel diodes.

The first to third pairs of switching elements are parallely connected to each other in bridge configuration.

A connecting point through which the switching elements Sup and Sun of the first pair are connected to each other in series is connected to an output lead extending from the separate terminal of the U-phase winding. Similarly, a connecting point through which the switching elements Svp and Svn of the second pair are connected to each other in series is connected to an output lead extending from the separate end of the V-phase winding. Moreover, a connecting point through which the switching elements Swp and Swn of the third pair are connected to each other in series is connected to an output lead extending from the separate end of the W-phase winding.

One end of the series-connected switching elements of each of the first, second, and third pairs is connected to the positive terminal of the high-voltage battery 22 via a positive terminal of the inverter 20. The other end of the series-connected switching elements of each of the first, second, and third pairs is connected to the negative terminal of the high-voltage battery 22 via a negative terminal of the inverter 20.

The control system 50 includes, as means for detecting operating conditions of each of the motor-generator 10 and the inverter 20, current sensors 40V and 40W, a voltage sensor 42, and a rotational angle sensor 44.

The current sensor 40V is arranged to allow measurement of an instantaneous V-phase alternating current iv actually flowing through the V-phase winding of the stator. Similarly, the current sensor 40W is arranged to allow measurement of an instantaneous W-phase alternating current iw actually flowing through the W-phase winding of the stator.

The current sensors 40V and 40W are communicable with the control apparatus CA.

Specifically, each of the current sensors 40V and 40W is operative to send, to the control apparatus CA, the instantaneous value of a corresponding one of the V-, and W-phase alternating currents.

The voltage sensor 42 is arranged to allow measurement of the input voltage, referred to as an input voltage VINV, to be supplied to the inverter 20 from the high-voltage power source 22 via the smoothing capacitor 24. The voltage sensor 42 is communicable with the control apparatus CA, and operative to send, to the control apparatus CA, the input voltage VINV.

The rotational angle sensor 44 includes, for example, resolver. The rotational angle sensor 44 is configured to measure, i.e. monitor, a rotational angle $\theta$ of the rotor 10a of the motor-generator 10. The rotational angle sensor 44 is communicable with the control apparatus CA, and operative to send, to the control apparatus CA, the monitored actual rotation angle $\theta$ of the rotor 10a. The rotational angle sensor serves as, for example, a parameter monitor for monitoring change of a harmonic current according to the present disclosure.

The control apparatus CA includes drivers Dr*# connected to the control terminals of the respective switching elements S*#, and a controller 30. The controller 30 is designed as, for example, a computer circuit including essentially of, for example, a CPU 32a and a memory 32b serving as, for example, a storage according to the present disclosure.

The controller 30 is connected to a request torque input unit 46 for inputting, to the control apparatus 30, a request torque Trq* for the motor-generator 10. For example, a controller higher in hierarchy than the controller 30 can be used as the request torque input unit 46 if the controllers are arranged in a hierarchical relationship.

Specifically, the controller 30 is designed to receive the measured values output from the sensors 40V, 40W, 42, and 44, and the request torque Trq* as received pieces of data. Then, the controller 30 is designed to generate, based on the received pieces of data set forth above, drive signals, i.e. PWM (pulse-width modulated) signals, g*# for individually driving the respective switching elements S*# of the inverter 20. The controller 30 is designed to supply the drive signals g*# to the respective drivers Dr*#. The drivers Dr*# are operative to output the drive signals g*# to the control terminals of the respective switching elements S*# of the inverter 20.

This individually turns on or off the respective switching elements S*#, thus converting the input voltage VINV into a controlled AC voltage, and supplying the controlled AC voltage to the motor-generator 10. The drive signals g*# aim to switch the respective switching elements S*# to feedback control at least one controlled variable, such as output torque, of the motor-generator 10 so that the at least one controlled variable matches the request torque Trq*.

For example, the controller 30 outputs the drive signals g*# that complementarily turns on the high- and low-side switching elements Sp and S*n of each pair. That is, the high- and low-side switching elements S*p and S*n of each pair are controlled to be alternately turned on.

Each of the drive signals g*# has a predetermined duty factor, i.e. a controllable on-pulse width for each switching cycle, in other words, a predetermined ratio, i.e. percentage, of on duration to the total duration of each switching cycle for a corresponding one of the switching elements S*#.

Next, an example of the specific structure of the controller 30 for performing torque feedback control using torque as a direct controlled variable will be described with reference to FIG. 2A.

As illustrated in FIG. 2A, the controller 30 includes a two-phase converter 30a, a velocity calculator 30b, a command-voltage calculator 30c, a velocity multiplier 30d, and a modulation-factor calculator 30e. The controller 30 also includes a modulation-factor limiter 30f, a drive signal generator 30g, a torque estimator 30h, a torque deviation calculator 30i, and a phase calculator 30j. The modules 30a to 30j cooperatively operate to carry out a torque-feedback control task described hereinafter. The modules 30a to 30j can be implemented as hardware modules, software modules, and/or hardware-software hybrid modules.

The two-phase converter 30a is operative to receive instantaneous V- and W-phase currents iv and iw measured by the respective current sensors 40V and 40W and the rotational angle θ of the d-axis of the rotor 10a. The current sensors 40V and 40W and the two-phase converter 30a serve as, for example, a current obtainer according to the present disclosure.

The two-phase converter 30a is operative to calculate an instantaneous U-phase current iu based on the instantaneous V- and W-phase currents iv and iw in accordance with Kirchhoff's law. Then, the two-phase converter 30a is operative to convert the instantaneous U-, V-, and W-phase currents iu, iv, and iw in a three-phase fixed-coordinate system into d-axis and q-axis current components idr and iqr in the d-q coordinate system of the rotor 1a based on the rotational angle θ of the rotor 1a. The stator coordinate system is fixedly defined relative to the stator; the stator coordinate system has fixed three axes corresponding to the three-phase windings of the stator. Specifically, the two-phase converter 30a performs the conversion using correlations between the d-q coordinate system and the stator coordinate system as a function of the rotational angle θ.

The velocity calculator 30b is operative to calculate an angular velocity ω of the d-axis of the rotor 10a based on the rotational angle θ of the rotor 10a.

The command-voltage calculator 30c has, for example, a map MA1 in data-table format, in mathematical expression format, and/or program format. The map MA1, which is for example stored in the memory 32b, includes a function, i.e. a correlation, of the variable of a command value Vn of an amplitude of an output voltage vector V of the inverter 20 in the d-q coordinate system with respect to the variable of the request torque Trq*. The amplitude of the output voltage vector V of the inverter 20 is defined as the square root of the sum of the square of a d-axis component and the square of a q-axis component of the output voltage vector V.

The command-voltage calculator 30c is operative to refer to the map MA1 using a value of the request torque Trq* to extract a command value Vn of the amplitude of the output voltage vector V of the inverter 20 corresponding to the value of the request torque Trq* in the map MA1. Then, the command-voltage calculator 30c divides the command value Vn of the amplitude of the output voltage vector V of the inverter 20 by the angular velocity ω, thus normalizing the command value Vn of the amplitude of the output voltage vector V. The normalized command value Vn of the amplitude of the output voltage vector V will be referred to as a normalized command-voltage amplitude Vn/ω. The command value Vn of the amplitude of the output voltage vector V will be referred to as a command amplitude value Vn hereinafter.

The velocity multiplier 30d is operative to multiply the normalized command-voltage amplitude Vn/ω by the angular velocity ω, thus calculating the command amplitude value Vn. For example, the command-voltage calculator 30c and the velocity multiplier 30d serve as, for example, an amplitude calculator according to the present disclosure.

The modulation-factor calculator 30e is operative to normalize the command amplitude value Vn using the input voltage VINV measured by the voltage sensor 42 to thereby calculate a normalized command amplitude value as a modulation factor M. The modulation factor M is input to the drive signal generator 30g via the modulation-factor limiter 30f. That is, the modulation factor M according to the first embodiment is defined as a ratio of the command amplitude voltage Vn to the half of the input voltage VINV.

When the modulation factor M is set to 1, the command amplitude value Vn is set to VINV/2. This means an RMS (Root-Mean-Square) value of the command amplitude value Vn is equal to $(VINV/2) \cdot (1/\sqrt{2})$. For example, the modulation-factor calculator 30e serves as, for example, a modulation-factor calculator according to the present disclosure.

The torque estimator 30h is operative to calculate an estimated torque Te that is actually created by the motor-generator 10 based on the d-axis and q-axis current components idr and iqr input from the two-phase converter 30a.

For example, the torque estimator 30h calculates the estimated torque Te using, for example, a map MA2 in data-table format, in mathematical expression format, and/or program format. The map MA2, which is for example stored in the memory 32b, includes a function, i.e. correlation, between the variable of the estimated torque Te with respect to the pair of variables of the d-axis and q-axis current components idr and iqr. The torque estimator 30h can retrieve a value of the estimated torque Te corresponding to values of the d-axis and q-axis current components idr and iqr in the map MA2. The torque estimator 30h also can calculate an estimated torque Te in accordance with a known model equation defined based on the variables of the d-axis and q-axis current components idr and iqr. Assigning the d-axis and q-axis current components idr and iqr to the model equation allows the estimated torque Te to be calculated.

The torque deviation calculator 30i is operative to subtract the estimated torque Te from the request torque Trq* to thereby calculate a torque deviation Δ between the estimated torque Te and the request torque Trq*.

The phase calculator 30j is operative to calculate, based on the torque deviation Δ, a phase δ of the output voltage vector V of the inverter 20 in the d-q coordinate system; the phase δ between a d-axis voltage component vd and a q-axis voltage component vq of the output voltage vector V in the d-q coordinate system (see FIG. 1).

Specifically, in the first embodiment, the phase calculator 30j calculates the phase δ of the output voltage vector V using a proportional gain term and an integral gain term of a PI feedback control algorithm (PI algorithm) using the torque deviation Δ as its input.

In the PI algorithm, the phase δ of the output voltage vector V is expressed based on the proportional gain term and integral gain term.

The proportional gain term for the phase δ of the output voltage vector contributes to change in the phase δ of the output voltage vector V in proportion to the temporal torque deviation Δ from a target value of zero.

The integral gain term is proportional to an accumulated offset of instantaneous values of the torque deviation Δ over time to reset the accumulated offset (steady-state deviation) over time to zero.

For example, the torque deviation calculator 30i and the phase calculator 30j serve as, for example, a phase calculator according to the present disclosure.

The drive signal generator 30g serves as, for example, a generator according to the present disclosure to generate, based on the phase δ of the output voltage vector V and the modulation factor M input from the respective phase calculator 30j and modulation-factor limiter 30f, the drive signals, i.e. PWM signals, g*# for the respective switching elements S*#.

Specifically, the drive signal generator 30g includes a map MA3 in data-table format, in mathematical expression format, and/or program format; the map MA3 is for example stored in the memory 32b. The map MA3 includes, as map data, a predetermined waveform of a reference drive signal, i.e. a predetermined on-off pulse pattern thereof, for each of specified values of the modulation factor M. The on-off pulse pattern of the reference drive signal is prepared for one cycle of the rotation angle θ, i.e. for 360 degrees of the rotation angle θ, of the rotor 10a. Specifically, pieces of map data MAD, i.e. on-off pulse patterns of the reference drive signal are so stored in the memory 32b as to correlate with the respective specified values of the modulation factor M. The map data, i.e. the on-off pulse pattern, of the reference drive signal is deter mined to obtain a corresponding one of the specified values of the modulation factor M.

Specifically, when a value of the modulation factor M is input to the drive signal generator 30g from the modulation-factor limiter 30f, the drive signal generator 30g selects one of the pieces of map data MAD for the reference drive signal; the selected map data MAD correlates with the input value of the modulation factor M. Then, the drive signal generator 30g determines an output timing of the on-off pulse pattern for each of the switching elements S*# based on the phase δ of the output voltage vector V, thus generating the drive signals g*# for each of the switching elements S*#. Then, the drive signal generator 30g sends the drive signals g*# to the respective drivers Dr*#, so that the switching elements S*# are turned on and off in accordance with the corresponding on-off pulse patterns.

Particularly, when an input value of the modulation factor M is equal to or lower than a first specified value Ma of 1.15, an on-off pulse pattern of the reference drive signal corresponding to the input value of the modulation factor M controls the inverter 20 in a sinusoidal control mode. In the sinusoidal control mode, the inverter 20 outputs a three-phase sinusoidal AC voltage with the angular velocity ω. The three-phase sinusoidal AC voltage with the angular velocity ω output from the inverter 20 is supplied to the motor-generator 10 as line-to-line voltages of the motor-generator 10.

Note that, as described above, if the modulation factor M is set to 1, the amplitude of the three-phase sinusoidal AC voltage is set to VINV/2, resulting in maximum line-to-line voltages being set to √3VINV/2. This may insufficiently use the conversion ability of the inverter 20 using the input voltage VINV.

That is, in a first example of the over-modulation mode, the amplitude of a fundamental component of one-phase voltage is higher than the half of the input voltage VINV to the inverter 20. In a second example of the over-modulation mode, the amplitude of a fundamental component of a line-to-line voltage as the output voltage of the inverter 20 is higher than the amplitude of the input voltage VINV to the inverter 20. The second example uses, for example, known third harmonic injection that superimposes one or more harmonics, such as the third harmonic, to a three-phase sinusoidal fundamental AC voltage. The second example of the over-modulation mode corresponds to the first specified value Ma of 1.15 of the modulation factor M. In the first embodiment, the second example of the over-modulation mode is used.

Specifically, in the first embodiment, the first specified value Ma of 1.15 of the modulation factor M controls the inverter 20 in the sinusoidal control mode using the known third harmonic injection. In the sinusoidal control mode using the known third harmonic injection, the inverter 20 outputs the three-phase sinusoidal AC voltage with the angular velocity ω. This makes it possible to obtain the peak-to-peak of the three-phase sinusoidal AC voltage, i.e. line-to-line voltages, output from the inverter 20 to be equal to the inverter input voltage VINV. This increases a range of the modulation factor M within which control based on the sinusoidal control mode can be carried out.

In addition, when an input value of the modulation factor M is higher than the first specified value Ma of 1.15 and lower than a second specified value Mb of 1.27, an on-off pulse pattern of the reference drive signal corresponding to the input value of the modulation factor M controls the inverter 20 in an over-modulation control mode. In the over-modulation control mode, the inverter 20 outputs a three-phase AC voltage including a fundamental voltage and harmonics voltages. In the over-modulation control mode, the amplitude and the RMS value of the fundamental voltage included in the output voltage of the inverter 20 in the over-modulation control mode are respectively higher than those of the three-phase sinusoidal AC voltage output from the inverter 20 in the sinusoidal control mode.

When an input value of the modulation factor M is the second specified value Mb of 1.27, an on-off pulse pattern of the reference drive signal corresponding to the input value of the modulation factor M controls the inverter 20 in a rectangular-control mode, i.e. a single-pulse mode. In the rectangular-control mode, the inverter 20 outputs a three-phase rectangular AC voltage as line-to-line rectangular voltages. Specifically, an on-off pulse pattern of the reference drive signal corresponding to the second specified value Mb of 1.27 of the modulation factor M is designed such that an on duration and an off duration of the reference drive signal for each of the switching elements S*# are set for one cycle of the electric angle θ of the rotor 10a. In other words, the on-off pulse pattern corresponding to the second specified value Mb of 1.27 of the modulation factor M includes for one cycle of the electric angle θ of the rotor 10a:

one on duration of the reference drive signal for turn-on of a high-side switching element S*p; and one on duration of the reference drive signal for turn-on of a corresponding low-side switching element S*n for one cycle of the electric angle θ of the rotor 10a.

Next, the modulation-factor limiter 30f, which is a specific structure according to the first embodiment, will be described in detail hereinafter.

The modulation-factor limiter 30f is provided to prevent reduction of ability and stability of the control apparatus CA to control output torque of the motor-generator 10 due to harmonic currents flowing in the motor-generator 10. The limiter 30f serves as, for example, a limiter according to the present disclosure.

First, a mechanism which reduces the ability and stability of the control apparatus CA to control the motor-generator 10 due to harmonic currents will be described hereinafter.

As described above, when the modulation factor M is equal to or lower than the first specified value Ma, the controller 30 operates in the sinusoidal control mode to generate a three-phase sinusoidal AC voltage as the output voltage of the inverter 20. Thus, it is possible to ignore harmonic components, which will be referred to as harmonic voltages, included in the output voltage of the inverter 20.

In contrast, when the modulation factor M is higher than the first specified value Ma so that the controller 30 operates in the over-modulation control mode, it is difficult to generate a three-phase sinusoidal AC voltage as the output voltage of the inverter 20. This results in an increase of the harmonic voltages, which are included in the output voltage of the inverter 20, applied to the motor-generator 10.

Harmonic voltages appearing in the motor-generator 10 based on harmonic voltages applied to the motor-generator 10 are composed mainly of odd-order harmonic voltages except for 3n-order harmonic voltages (n is an integer equal to or more than 1). Specifically, the fifth-order harmonic voltage, the seventh-order harmonic voltage, the eleventh-order harmonic voltage, the thirteenth-order harmonic voltage, . . . mainly occur in the three-phase fixed-coordinate system of the motor-generator 10. This is because the three-phase windings of the stator are shifted by an electric angle of $2\pi/3$ radian in phase from each other, so that 3n-order harmonics voltages included in the line-to-line voltages, i.e. the output voltage of the inverter 20, are cancelled with respect to each other.

It is known that the amplitude of an order harmonic voltage increases with a decrease of the order of the harmonic voltage.

Let us consider a case where:

the amplitudes, referred to as first amplitudes, of the harmonic voltages are included in the output voltage of the inverter 20 that is driven based on a given on-off pulse pattern and a first value of the input voltage VINV; and the amplitudes, referred to as second amplitudes, of the harmonic voltages are included in the output voltage of the inverter 20 that is driven based on the same on-off pulse pattern and a second value of the input voltage VINV.

In this case, the higher the second value of the input voltage VINV is than the first value of the input voltage VINV, the more the second amplitudes increase as compared with the first amplitudes.

The higher the harmonic voltages applied to the motor-generator are, the higher the levels of harmonic currents flowing in the motor-generator 10, i.e. the three-phase windings, due to the harmonic voltages. Particularly, a decrease of the angular velocity $\omega$ of the rotor 10a decreases the impedance of the motor-generator 10, i.e. the three-phase windings, against the harmonic voltages. This may result in an increase of the levels of the harmonic currents flowing in the motor-generator 10. The impedance of the motor-generator 10, i.e. the three-phase windings, against the harmonic voltages will be referred to as a harmonic impedance hereinafter.

The reason why a decrease of the angular velocity $\omega$ of the rotor 10a decreases the harmonic impedance will be described hereinafter.

Let us describe the reason using the fifth-order harmonic voltage, the seventh-order harmonic voltage, the eleventh-order harmonic voltage, and the thirteenth-order harmonic voltage as an example of odd-order harmonic voltages except for 3n-order harmonic voltages in the three-phase fixed-coordinate system.

The fifth- and seventh-order harmonic voltages in the three-phase fixed-coordinate system can be converted to the sixth-order harmonic voltage in the d-q coordinate system. The eleventh- and thirteenth-order harmonic voltages can be converted to the twelfth-order harmonic voltage in the d-q coordinate system.

As described above, the amplitude of an order harmonic voltage increases with a decrease of the order of the harmonic voltage, so that, in the d-q coordinate system, there is a predominance of the sixth-order harmonic voltages in comparison to the twelfth-order harmonic voltages. Thus, let us focus on the sixth-order harmonic voltages as an example hereinafter.

The sixth-order harmonic voltage can be expressed by the following voltage equation EQ1:

$$\begin{bmatrix} v_{d6} \\ v_{q6} \end{bmatrix} = \begin{bmatrix} 0 & -6\omega L_{q6} \\ 6\omega L_{d6} & 0 \end{bmatrix} \begin{bmatrix} i_{d6} \\ i_{q6} \end{bmatrix} + \begin{bmatrix} 0 \\ 6\omega \phi_6 \end{bmatrix} \quad [\text{EQ 1}]$$

where:

$L_{d6}$ represents a d-axis inductance with respect to the sixth-order harmonic voltage;

$L_{q6}$ represents a q-axis inductance with respect to the sixth-order harmonic voltage;

$i_{d6}$ represents a d-axis current based on the sixth-order harmonic voltage;

$i_{q6}$ represents a q-axis current based on the sixth-order harmonic voltage; and $\phi_6$ represents a permanent-magnet flux linkage to each phase armature winding.

Note that, in the voltage equation EQ1, the resistance of each-phase armature winding is ignored and it is assumed that the motor-generator 10 is operating in steady state such that the rotational speed of the rotor 10a is constantly maintained.

In the voltage equation EQ1, values $-6\omega L_{q6}$ and $6\omega L_{d6}$ of the first term on the right side respectively show the harmonic impedance against the sixth-order harmonic voltage. As is obvious from the values $-6\omega L_{q6}$ and $6\omega L_{d6}$ of the harmonic impedance against the sixth-order harmonic voltage, the lower the angular velocity $\omega$ of the rotor 10a is, the lower the harmonic impedance of the motor-generator 10 is.

A decrease of the harmonic impedance of the motor-generator 10 based on reduction of the angular velocity $\omega$ of the rotor 10a might cause the levels of harmonic currents flowing in the motor-generator 10 to increase. An increase of the levels of harmonic currents flowing in the motor-generator 10 might generate ripples in the output torque of the motor-generator 10, and/or may cause instability of controlling the output torque of the motor-generator 10. This might reduce the ability of the control apparatus CA to control the output torque of the motor-generator 10.

In order to address such an issue, the control apparatus CA is equipped with the modulation-factor limiter 30f installed in the controller 30.

Next, an example of the structure and functions of the modulation-factor limiter 30f will be described hereinafter.

The modulation-factor limiter 30f is operative to limit a value of the modulation factor M calculated by the modulation-factor calculator 30e to a predetermined upper limit $M_{limit}$ when the calculated value of the modulation factor M exceeds the upper limit $M_{limit}$.

In the first embodiment, a possible range within which the angular velocity $\omega$ of the rotor 10a can exist while the motor-generator 10 is running is previously determined. The possible range, referred to as an angular-velocity possible range, is defined between a minimum angular velocity $\omega_{min}$ and a maximum angular velocity $\omega_{max}$ inclusive.

Within the angular-velocity possible range, a threshold angular velocity $\omega_{th}$ is previously determined. A range equal to or higher than the minimum angular velocity $\omega_{min}$ and lower than the threshold angular velocity $\omega_{th}$ is defined as a first angular-velocity range. A range equal to or higher than the threshold angular velocity $\omega_{th}$ and equal to or lower than the maximum angular velocity $\omega_{max}$ is defined as a second angular-velocity range.

Under the definition, the upper limit $M_{limit}$ is determined individually for each of the first angular-velocity range $\omega_{min}$-$\omega_{th}$ and the second angular-velocity range $\omega_{th}$-$\omega_{max}$.

Specifically, as the upper limit $M_{limit}$ for the second angular-velocity range $\omega_{th}$-$\omega_{max}$, the second specified value Mb is determined. As the upper limit $M_{limit}$ for the first angular-velocity range $\omega_{min}$-$\omega_{th}$, a value lower than the second specified value Mb is determined. The value of the upper limit $M_{limit}$ for the first angular-velocity range $\omega_{min}$-$\omega_{th}$ will be referred to as a first upper limit $M1_{limit}$ and the value of the upper limit $M_{limit}$ for the second angular-velocity range $\omega_{th}$-$\omega_{max}$ will be referred to as a second upper limit $M2_{limit}$.

These determinations aim to reduce the levels of harmonic currents when the angular velocity $\omega$ of the rotor 10a is within the first angular-velocity range $\omega_{min}$-$\omega_{th}$. Specifically, as described above, the harmonic impedance when the angular velocity $\omega$ of the rotor 10a is within the first angular-velocity range $\omega_{min}$-$\omega_{th}$ is lower than the harmonic impedance when the angular velocity $\omega$ of the rotor 10a is within the second angular-velocity range $\omega_{th}$-$\omega_{max}$. For this reason, when the angular velocity $\omega$ of the rotor 10a is within the first angular-velocity range $\omega_{min}$-$\omega_{th}$, it is necessary to limit the command amplitude value Vn in order to reduce the levels of harmonic currents. Thus, the first upper limit $M1_{limit}$ determined for the first angular-velocity range $\omega_{min}$-$\omega_{th}$ is lower than the second upper limit $M2_{limit}$ determined for the second angular-velocity range $\omega_{th}$-$\omega_{max}$, resulting in limitation of the command amplitude value Vn when the angular velocity $\omega$ of the rotor 10a is within the first angular-velocity range $\omega_{min}$-$\omega_{th}$.

For example, the modulation-factor limiter 30f has a map MA4 in data-table format, in mathematical expression format, and/or program format. The map MA4, which is for example stored in the memory 32b, includes a function, i.e. correlation, of the variable of the upper limit $M_{limit}$ with respect to the variable of the angular velocity $\omega$. The modulation-factor limiter 30f can retrieve a value of the first upper limit $M1_{limit}$ corresponding to the angular velocity $\omega$ when the angular velocity $\omega$ is within the first angular-velocity range $\omega_{min}$-$\omega_{th}$, and a value of the second upper limit $M2_{limit}$ corresponding to the angular velocity $\omega$ when the angular velocity $\omega$ is within the second angular-velocity range $\omega_{th}$-$\omega_{max}$.

Particularly, the modulation-factor limiter 30f is configured to reduce the first upper limit $M1_{limit}$ with a decrease of the angular velocity $\omega$ of the rotor 10a. This configuration compensates for the fact that, the lower the angular velocity $\omega$ is, the lower the harmonic impedance of the motor-generator 10.

For example, in the first embodiment, the first upper limit $M1_{limit}$ when the angular velocity $\omega$ of the rotor 10a is a value adjacent to the threshold angular velocity $\omega_{th}$ is set to a corresponding value adjacent to the second specified value Mb. The first upper limit $M1_{limit}$ when the angular velocity $\omega$ of the rotor 10a is the minimum angular velocity $\omega_{min}$ is set to the first specified value Ma. Thus, the first upper limit $M1_{limit}$ decreases, for example linearly, from the value adjacent to the second specified value Mb to the first specified value Ma with decrease of the angular velocity $\omega$ of the rotor 10a from the value adjacent to the threshold angular velocity $\omega_{th}$ to the minimum angular velocity $\omega_{limit}$. In contrast, while the angular velocity $\omega$ of the rotor 10a is within the second angular-velocity range $\omega_{th}$-$\omega_{max}$, the second upper limit $M2_{limit}$ is constantly set to the second specified value Mb.

The change of the upper limit $M_{limit}$ depending on the angular velocity $\omega$ of the rotor 10a used by the modulation-factor limiter 30f is illustrated as a function of the upper limit $M_{limit}$ to the angular velocity $\omega$ previously determined in the map MA4 (see FIG. 2A).

Figure 2B:
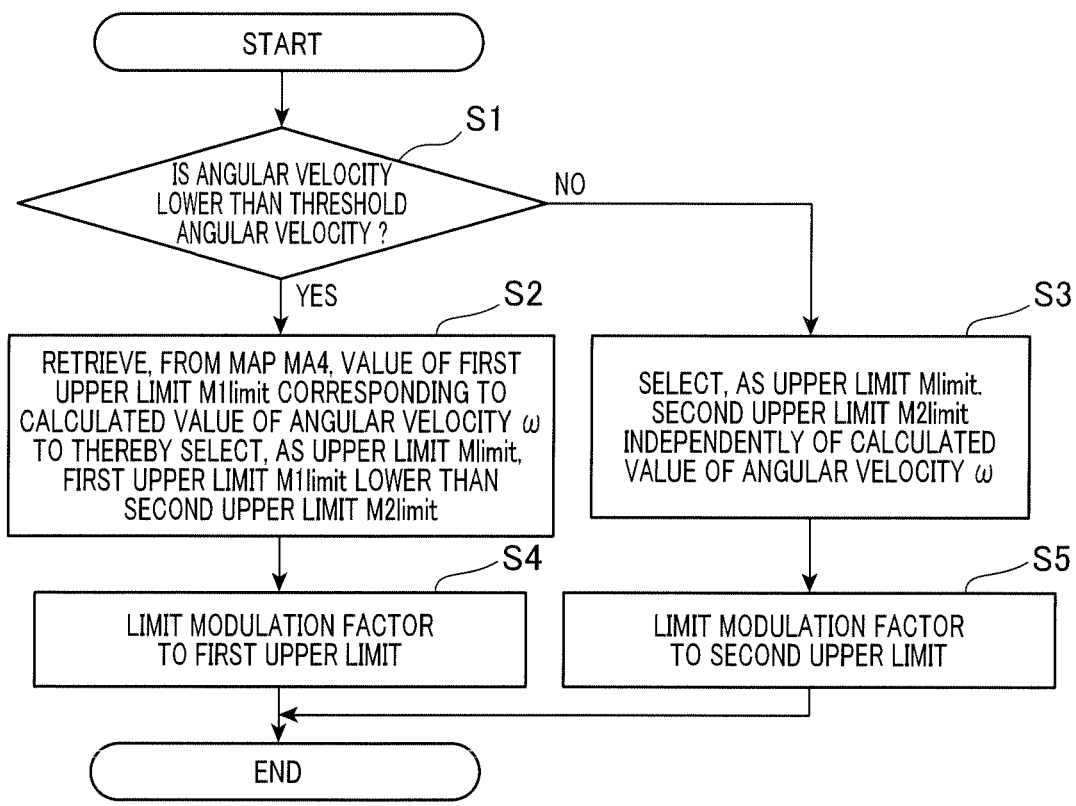
FIG. 2B is a flowchart schematically illustrating a modulation-factor limitation routine to be executed by the controller according to the first embodiment.

Specifically, the controller 30, i.e. the modulation-factor limiter 30f, performs the following modulation-factor limitation routine illustrated in FIG. 2B at, for example, every preset period.

The modulation-factor limiter 30f determines whether the angular velocity $\omega$ calculated by the velocity calculator 30b is within the first angular-velocity range $\omega_{min}$-$\omega_{th}$, i.e. is lower than the threshold angular velocity $\omega_{th}$ in step S1 of FIG. 2B.

When it is determined that a value of the angular velocity $\omega$ calculated by the velocity calculator 30b is within the first angular-velocity range $\omega_{min}$-$\omega_{th}$ (YES in step S1), the modulation-factor limiter 30f selects, as the upper limit $M_{limit}$, the first upper limit $M1_{limit}$ lower than the second specified value Mb (1.27) in step S2. Specifically, in step S2, the modulation-factor limiter 30f retrieves, from the map MA4, a value of the first upper limit $M1_{limit}$ corresponding to the calculated value of the angular velocity $\omega$.

That is, when a value of the angular velocity $\omega$ calculated by the velocity calculator 30b is within the first angular-velocity range $\omega_{min}$-$\omega_{th}$, the modulation-factor limiter 30f limits the modulation factor M calculated by the modulation-factor calculator 30e to the value of the first upper limit $M1_{limit}$ corresponding to the monitored value of the angular velocity $\omega$ in step S3.

For example, it is assumed that:

a value $\omega_d$ of the angular velocity $\omega$ is calculated by the velocity calculator 30b, which is within the first angular-velocity range $\omega_{min}$-$\omega_{th}$ (see the map MA4); and a value Mc of the modulation factor M is calculated by the modulation-factor calculator 30e (see the map MA4).

In this assumption, even if the calculated value Mc of the modulation factor M is higher than a value Md of the first upper limit $M1_{limit}$ corresponding to the calculated value $\omega_d$ of the angular velocity $\omega$, the modulation-factor limiter 30f outputs the value Md of the first upper limit $M1_{limit}$ to the drive signal generator 30g. This limits the modulation factor M to the value Md of the first upper limit $M1_{limit}$, thus limiting over-modulation control of the output voltage of the inverter INV.

Otherwise, when it is determined that the value of the angular velocity $\omega$ calculated by the velocity calculator 30b is within the second angular-velocity range $\omega_{th}$-$\omega_{min}$ (NO in step S1), the modulation-factor limiter 30f selects, as the upper limit $M_{limit}$, the second specified value Mb (1.27) as the second upper limit $M2_{limit}$ independently of the calculated value of the angular velocity $\omega$ in step S4.

That is, when a value of the angular velocity $\omega$ calculated by the velocity calculator 30b is within the second angular-velocity range $\omega_{th}$-$\omega_{max}$, the modulation-factor limiter 30f limits the modulation factor M calculated by the modulation-factor calculator 30e to the value of the second upper limit $M2_{limit}$ in step S5. This provides over-modulation control of the output voltage of the inverter INV without limitation thereof.

Specifically, the operations in steps S1, S2, and S4 serve as, for example, an upper limit setter according to the present disclosure, and the operations in steps S3 and S5 serve as, for example, a modulation-factor limiter according to the present disclosure.

The modulation factor M output from the modulation-factor limiter 30f is input to the drive signal generator 30g. The drive signal generator 30g generates:

the drive signals g*# based on the limited modulation factor M obtained by the modulation-factor limiter 30f and the phase δ of the output voltage vector V when the calculated angular velocity ω of the rotor 10a is lower than the threshold angular velocity $\omega_{th}$; and the drive signals g*# based on the modulation factor M unlimited by the modulation-factor limiter 30f and the phase δ of the output voltage vector V when the calculated angular velocity ω of the rotor 10a is equal to or higher than the threshold angular velocity $\omega_{th}$.

Specifically, the control apparatus CA drives the switching elements S*# based on the corresponding drive signals g*# generated by the drive signal generator 32 via the corresponding drivers Dr*#. This makes it possible to reduce the levels of the harmonic voltages included in the output voltage of the inverter 20 to be equal to or lower than a predetermined allowable upper-limit level. The predetermined allowable upper-limit level is defined as an upper limit level that allows the control apparatus CA to maintain excellent the ability to control the motor-generator 10. Specifically, the predetermined allowable upper-limit level varies depending on the angular velocity ω of the rotor 10a such that, the lower the angular velocity ω of the rotor 10a is within the first angular-velocity range $\omega_{min}$-$\omega_{th}$, the lower the predetermined allowable upper-limit level is. That is, the modulation-factor limiter 30f is configured to reduce the first upper limit $M1_{limit}$ with a decrease of the angular velocity ω of the rotor 10a. This configuration compensates for the fact that, the lower the angular velocity ω is, the lower the harmonic impedance of the motor-generator 10 is. This configuration reliably limits the harmonic voltages when the angular velocity ω of the rotor 10a is within a lower region in the first angular-velocity range $\omega_{min}$-$\omega_{th}$.

As described above, the control apparatus CA according to the first embodiment is configured to set the first upper limit $M1_{limit}$ for the first angular-velocity range $\omega_{min}$-$\omega_{th}$ to be lower than the second upper limit $M2_{limit}$ for the second angular-velocity range $\omega_{th}$-$\omega_{max}$. This configuration limits the modulation factor M to the value of the first upper limit $M1_{limit}$ corresponding to the monitored value of the angular velocity ω even if the value of the modulation factor M calculated by the modulation-factor calculator 30e is higher than the value of the first upper limit $M1_{limit}$ corresponding to the monitored value of the angular velocity ω. thereby limit the command amplitude value Vn. This results in reduction of the levels of harmonic currents when the angular velocity ω of the rotor 10a is within the first angular-velocity range $\omega_{min}$-$\omega_{th}$, thus improving the ability and stability of the control apparatus CA to control the output torque of the motor-generator 10.

Particularly, the control apparatus CA is configured such that, the lower the angular velocity ω of the rotor 10a is within the first angular-velocity range $\omega_{min}$-$\omega_{th}$, the lower the predetermined allowable upper-limit level is. This configuration compensates for the reduction of the harmonic impedance of the motor-generator 10 due to reduction of the angular velocity ω of the rotor 10a, thus reliably limiting the harmonic voltages when the angular velocity ω of the rotor 10a is within a lower region in the first angular-velocity range $\omega_{min}$-$\omega_{th}$. This therefore contributes to further improvement of the ability of the control apparatus CA to control the output torque of the motor-generator 10.

The control apparatus CA is further configured to perform a simple method to limit the modulation factor M by the upper limit $M_{limit}$ to thereby reduce the levels of harmonic currents, resulting in more reduction of operation loads of the control apparatus CA as compared with another complicated method to limit the modulation factor M.

Second Embodiment

A control apparatus CA1 for the motor-generator 10 according to a second embodiment of the present disclosure will be described with reference to FIGS. 3A and 3B.

The structure and/or functions of the control apparatus CA1 according to the second embodiment are different from the control apparatus CA according to the first embodiment by the following points. So, the different points will be mainly described hereinafter.

The control apparatus CA1 according to the second embodiment is configured to set the upper limit $M_{limit}$ of the modulation factor M using the input voltage VINV in addition to the angular velocity ω of the rotor 10a.

Figure 3A:
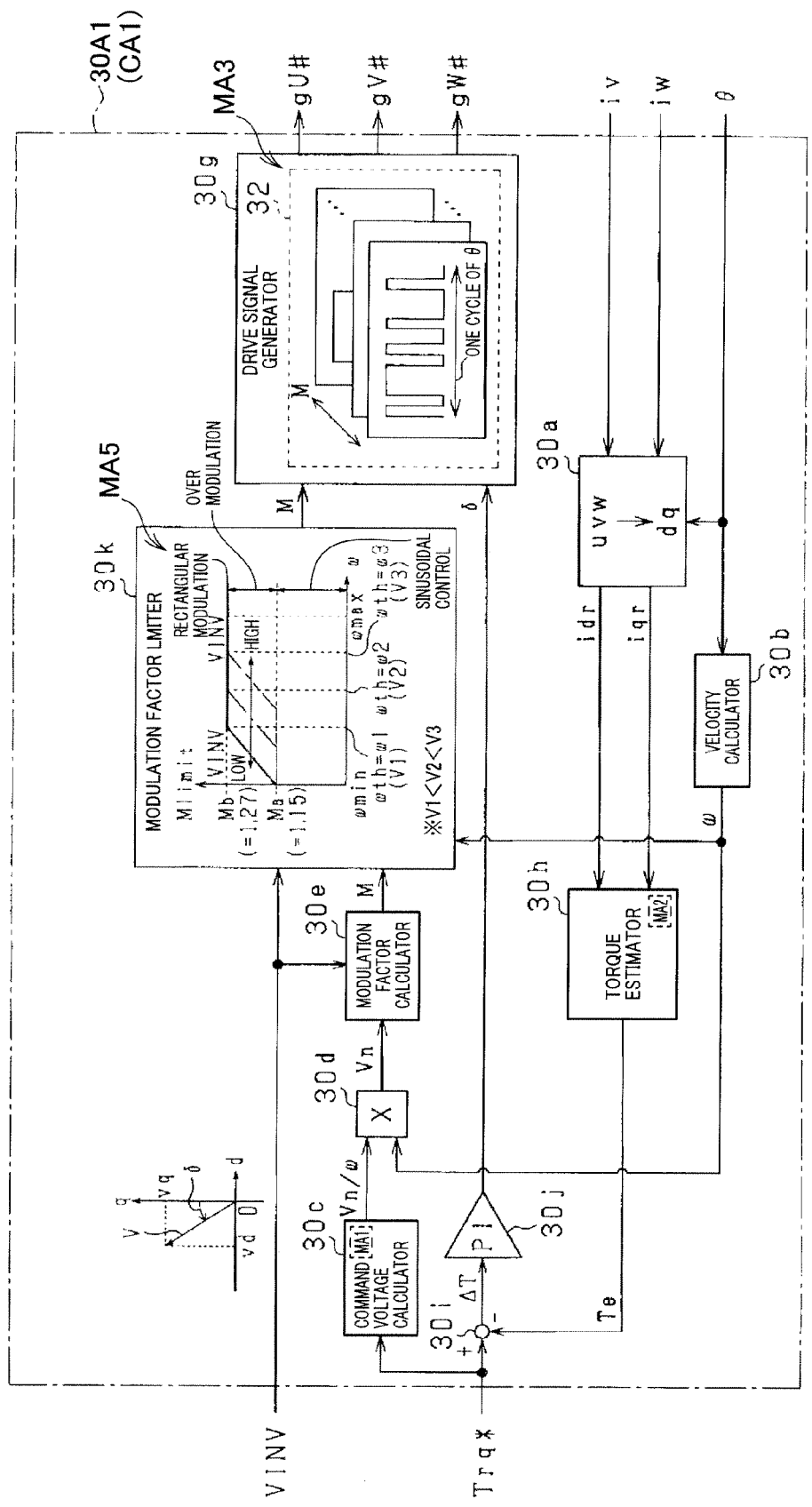
FIG. 3A is a block diagram schematically illustrating an example of the specific structure of a controller of a control apparatus according to a second embodiment of the present disclosure.

FIG. 3A schematically illustrates an example of the specific structure of a controller 30A1 according to the second embodiment. Like reference characters are assigned to like modules between the controllers 30 and 30A1, so that redundant descriptions of the like modules illustrated in FIG. 3A are omitted or simplified.

Referring to FIG. 3A, to a modulation-factor limiter 30k of the controller 30A1, the input voltage VINV measured by the voltage sensor 42 is input in addition to the angular velocity ω. The modulation-factor limiter 30k is configured to increase the threshold angular velocity $\omega_{th}$ with increase of the input voltage VINV. Specifically, the modulation-factor limiter 30k is configured to expand, within the angular-velocity possible range $\omega_{min}$ to $\omega_{max}$, a region to limit the modulation factor M calculated by the modulation calculator 30e to the higher side, i.e. to the maximum angular velocity $\omega_{max}$ with increase of the input voltage VINV. This configuration compensates for the fact that, the higher the input voltage VINV is, the higher the harmonic voltages included in the output voltage of the inverter 20 are, resulting in an increase of the levels of harmonic currents flowing in the motor-generator 10.

For example, the modulation-factor limiter 30k has a map MA5 each in data-table format, in mathematical expression format, and/or program format. The map MA5, which is for example stored in the memory 32b, represents a plurality of functions, i.e. correlations, each of which is defined between the variable of the angular velocity ω, the variable of the first upper limit $M1_{limit}$, and the variable of the second upper limit $M2_{limit}$. These functions will be referred to as upper-limit functions.

That is, the upper-limit functions have respective different values of the threshold angular velocity $\omega_{th}$, and the variable of the threshold angular velocity $\omega_{th}$ correlates with a variable of the input voltage VINV.

Figure 3B:
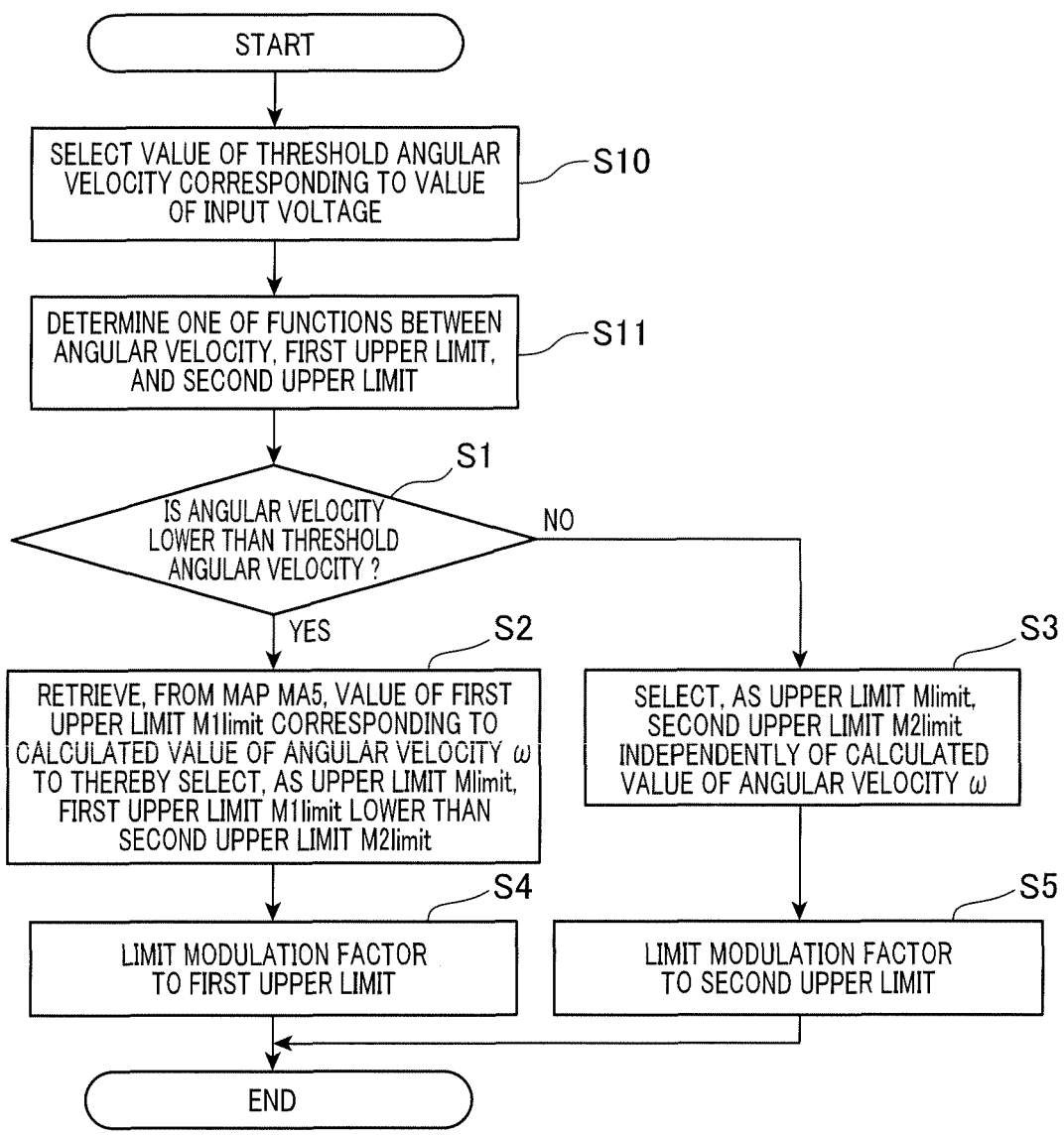
FIG. 3B is a flowchart schematically illustrating a modulation-factor limitation routine to be executed by the controller according to the second embodiment.

The controller 30A1, i.e. the modulation-factor limiter 30k, performs the following modulation-factor limitation routine illustrated in FIG. 3B at, for example, every preset period.

Specifically, the modulation-factor limiter 30k selects a value of the threshold angular velocity $\omega_{th}$ corresponding to the value of the input voltage VINV from, for example, the map MA5 in step S10 of FIG. 3B. This operation in step S10 increases the threshold angular velocity $\omega_{th}$ with an increase of the input voltage VINV.

Then, the modulation-factor limiter 30k selects one of the upper-limit functions between the angular velocity ω, the first upper limit $M1_{limit}$, and the second upper limit $M2_{limit}$ in step S11.

Next, the modulation-factor limiter 30k retrieves a value of the first upper limit $M1_{limit}$ corresponding to the angular velocity ω from the determined upper-limit function when the angular velocity ω is within the first angular-velocity range $\omega_{min}$-$\omega_{th}$ (see steps S1 and S2), and a value of the second upper limit $M2_{limit}$ corresponding to the angular velocity ω from the determined upper-limit function when the angular velocity ω is within the second angular-velocity range $\omega_{th}$-$\omega_{max}$ (see steps S1 and S3). Note that, in step S2 according to the second embodiment, the map MA5 is used in place of the map MA4.

Particularly, in the second embodiment, each of the upper-limit functions is designed to satisfy the following requirements:

the minimum value of the first upper limit $M1_{limit}$ is fixed to the first specified value Ma; and the rate of change of the first upper limit $M1_{limit}$ per unit angular velocity ω, i.e. the inclination of change of the first upper limit $M1_{limit}$ is constant.

Specifically, FIG. 3A schematically illustrates the first, second, and third upper-limit functions each corresponding to a value of the threshold angular velocity $\omega_{th}$; the value of the threshold angular velocity $\omega_{th}$ for each of the first to third upper-limit functions correlates with a corresponding value of the variable of the input voltage VINV.

Referring to FIG. 3A, the first upper-limit function has a first value ω1 of the threshold angular velocity $\omega_{th}$ correlating with a first value V1 of the input voltage VINV. The second upper-limit function has a second value ω2 of the threshold angular velocity $\omega_{th}$ correlating with a second value V2 of the input voltage VINV. The third upper-limit function has a third value ω3 of the threshold angular velocity $\omega_{th}$ correlating with a third value V3 of the input voltage VINV. The first to third values ω1 to ω3 of the threshold angular velocity $\omega_{th}$ have a correlation that the third value ω3 is higher than the second value ω2 that is higher than the first value ω1, which is expressed by ω1<ω2<ω3. Similarly, the first to third values V1 to V3 of the input voltage VINV have a correlation that the third value V3 is higher than the second value V2 that is higher than the first value V1, which is expressed by V1<V2<V3.

In the block 30k of FIG. 3A, the first upper-limit function is represented by a solid line, the second upper-limit function is represented by a dashed-dot line, and the third upper-limit function is represented by two-dot chain line.

Other functions of the control apparatus CA1 according to the second embodiment are substantially identical to those of the control apparatus CA according to the first embodiment.

As described above, the control apparatus CA1 according to the second embodiment is configured to increase the threshold angular velocity angular velocity $\omega_{th}$ with increase of the input voltage VINV. This configuration prevents an increase of the levels of harmonic currents due to an increase of the input voltage VINV. This results in further improvement of the ability and stability of the control apparatus CA1 to control the output torque of the motor-generator 10 in addition to the aforementioned advantages achieved by the control apparatus CA according to the first embodiment.

Third Embodiment

A control apparatus CA2 for the motor-generator 10 according to a third embodiment of the present disclosure will be described with reference to FIGS. 4A and 4B.

The structure and/or functions of the control apparatus CA2 according to the third embodiment are different from the control apparatus CA1 according to the second embodiment by the following points. So, the different points will be mainly described hereinafter.

The control apparatus CA2 according to the third embodiment is configured to set the upper limit $M_{limit}$ of the modulation factor M using the request torque Trq* in addition to the input voltage VINV and the angular velocity ω of the rotor 10a.

Figure 4A:
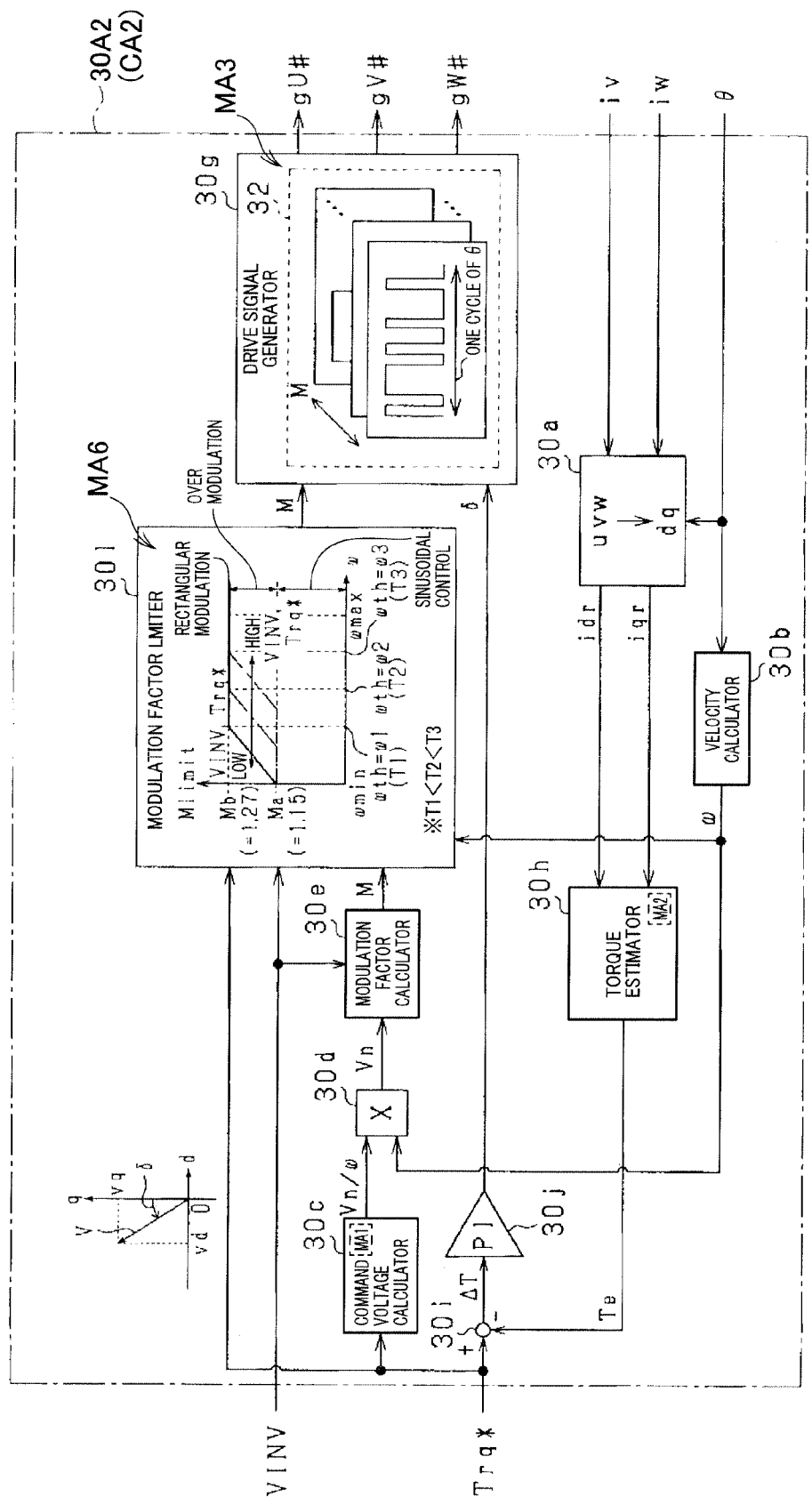
FIG. 4A is a block diagram schematically illustrating an example of the specific structure of a controller of a control apparatus according to a third embodiment of the present disclosure.

FIG. 4A schematically illustrates an example of the specific structure of a controller 30A2 according to the third embodiment. Like reference characters are assigned to like modules between the controllers 30A1 and 30A2, so that redundant descriptions of the like modules illustrated in FIG. 4A are omitted or simplified.

Referring to FIG. 4A, to a modulation-factor limiter 30l of the controller 30A2, the request torque Trq* is input from the request torque input unit 46 in addition to the angular velocity ω and the input voltage VINV or in addition to the angular velocity ω. The modulation-factor limiter 30l is configured to increase the threshold angular velocity $\omega_{th}$ with increase of the request torque Trq*. Specifically, the modulation-factor limiter 30l is configured to expand, within the angular-velocity possible range $\omega_{min}$ to $\omega_{max}$, a region to limit the modulation factor M calculated by the modulation calculator 30e to the higher side, i.e. to the maximum angular velocity $\omega_{max}$ with increase of the request torque Trq*. This configuration compensates for the fact that, the greater the request torque Trq* is, the higher the harmonic voltages included in the output voltage of the inverter 20 are. That is, the greater the request torque Trq* is, the higher the level of a three-phase alternating current flowing in the motor-generator 10 is. An increase of the three-phase alternating current flowing in the motor-generator 10 causes reduction of the inductances of the respective d and q axes due to, for example, magnetic saturation. This can be applied to the harmonic voltages, so that d-axis and q-axis inductances (see the equation EQ1) are also reduced against the harmonic voltages. This might reduce the harmonic impedance of the motor-generator 10, resulting in an increase of the levels of harmonic currents.

For example, the modulation-factor limiter 30l has a map MA6 each in data-table format, in mathematical expression format, and/or program format. The map MA6, which is for example stored in the memory 32b, represents a plurality of upper-limit functions, i.e. correlations, each of which is defined between the variable of the angular velocity ω, the variable of the first upper limit $M1_{limit}$, and the variable of the second upper limit $M2_{limit}$.

That is, the upper-limit functions have respective different values of the threshold angular velocity $\omega_{th}$, and the variable of the threshold angular velocity $\omega_{th}$ correlates with each of a variable of the input voltage VINV and a variable of the request torque Trq*.

Figure 4B:
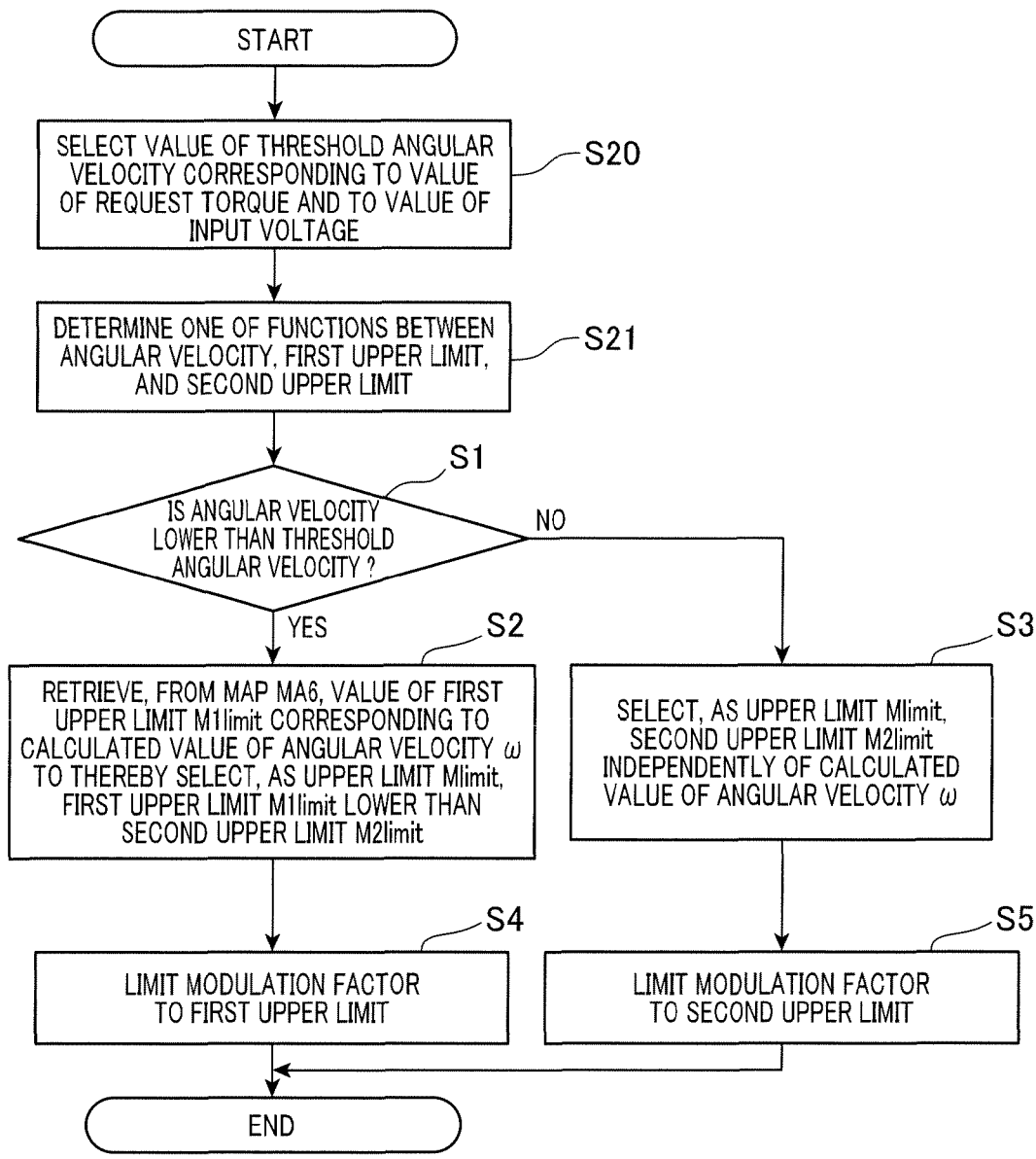
FIG. 4B is a flowchart schematically illustrating a modulation-factor limitation routine to be executed by the controller according to the third embodiment.

The controller 30A2, i.e. the modulation-factor limiter 30l, performs the following modulation-factor limitation routine illustrated in FIG. 4B at, for example, every preset period.

Specifically, the modulation-factor limiter 30 selects a value of the threshold angular velocity $\omega_{th}$ corresponding to the value of the request torque Trq* and the value of the input voltage VINV from, for example, the map MA6 in step S20 of FIG. 4B. This operation in step S20 increases the threshold angular velocity $\omega_{th}$ with an increase of the input voltage VINV and an increase of the request torque Trq*.

Then, the modulation-factor limiter 30l determines one of the upper-limit functions between the angular velocity ω, the first upper limit $M1_{limit}$, and the second upper limit $M2_{limit}$ in step S21.

Next, the modulation-factor limiter 30l retrieves a value of the first upper limit $M1_{limit}$ corresponding to the angular velocity ω from the determined upper-limit function when the angular velocity ω is within the first angular-velocity range $\omega_{min}$-$\omega_{th}$ (see steps S1 and S2), and a value of the second upper limit $M2_{limit}$ corresponding to the angular velocity ω from the determined upper-limit function when the angular velocity ω is within the second angular-velocity range $\omega_{th}$-$\omega_{max}$. (see steps S1 and S3). Note that, in step S2 according to the third embodiment, the map MA6 is used in place of the map MA4.

Particularly, in the third embodiment, each of the upper-limit functions is designed to satisfy the following requirements:

the minimum value of the first upper limit $M1_{limit}$ is fixed to the first specified value Ma; and the rate of change of the first upper limit $M1_{limit}$ per unit angular velocity ω, i.e. the inclination of change of the first upper limit $M1_{limit}$ is constant.

Specifically, FIG. 4A schematically illustrates the first, second, and third upper-limit functions each corresponding to a value of the threshold angular velocity $\omega_{th}$; the value of the threshold angular velocity $\omega_{th}$ for each of the first to third upper-limit functions correlates with a corresponding value of the variable of the request torque Trq*.

Referring to FIG. 4A, the first upper-limit function has a first value ω1 of the threshold angular velocity $\omega_{th}$ correlating with a first value T1 of the request torque Trq*. The second upper-limit function has a second value ω2 of the threshold angular velocity $\omega_{th}$ correlating with a second value T2 of the request torque Trq*. The third upper-limit function has a third value ω3 of the threshold angular velocity $\omega_{th}$ correlating with a third value T3 of the request torque Trq*. The first to third values ω1 to ω3 of the threshold angular velocity $\omega_{th}$ have a correlation that the third value ω3 is higher than the second value ω2 that is higher than the first value ω1, which is expressed by ω1<ω2<ω3. Similarly, the first to third values T1 to T3 of the request torque Trq* have a correlation that the third value T3 is higher than the second value T2 that is higher than the first value T1, which is expressed by T1<T2<T3.

In the block 30l of FIG. 4A, the first upper-limit function is represented by a solid line, the second upper-limit function is represented by a dashed-dot line, and the third upper-limit function is represented by two-dot chain line.

Other functions of the control apparatus CA2 according to the third embodiment are substantially identical to those of the control apparatus CA1 according to the second embodiment.

As described above, the control apparatus CA2 according to the third embodiment is configured to increase the threshold angular velocity angular velocity $\omega_{th}$ with increase of the request torque Trq*. This configuration prevents an increase of the levels of harmonic currents due to an increase of the request torque Trq*. This results in further improvement of the ability and stability of the control apparatus CA2 to control the output torque of the motor-generator 10 in addition to the aforementioned advantages achieved by the control apparatus CA1 according to the second embodiment.

Fourth Embodiment

A control apparatus CA3 for the motor-generator 10 according to a fourth embodiment of the present disclosure will be described with reference to FIGS. 5A and 5B.

The structure and/or functions of the control apparatus CA3 according to the fourth embodiment are different from the control apparatus CA2 according to the third embodiment by the following points. So, the different points will be mainly described hereinafter.

The control apparatus CA3 according to the fourth embodiment is configured to set the upper limit $M_{limit}$ of the modulation factor M using the amplitude In of a current vector I in addition to the input voltage VINV and the angular velocity ω of the rotor 10a; the amplitude In positively correlates with currents actually flowing in the motor-generator 10.

Figure 5A:
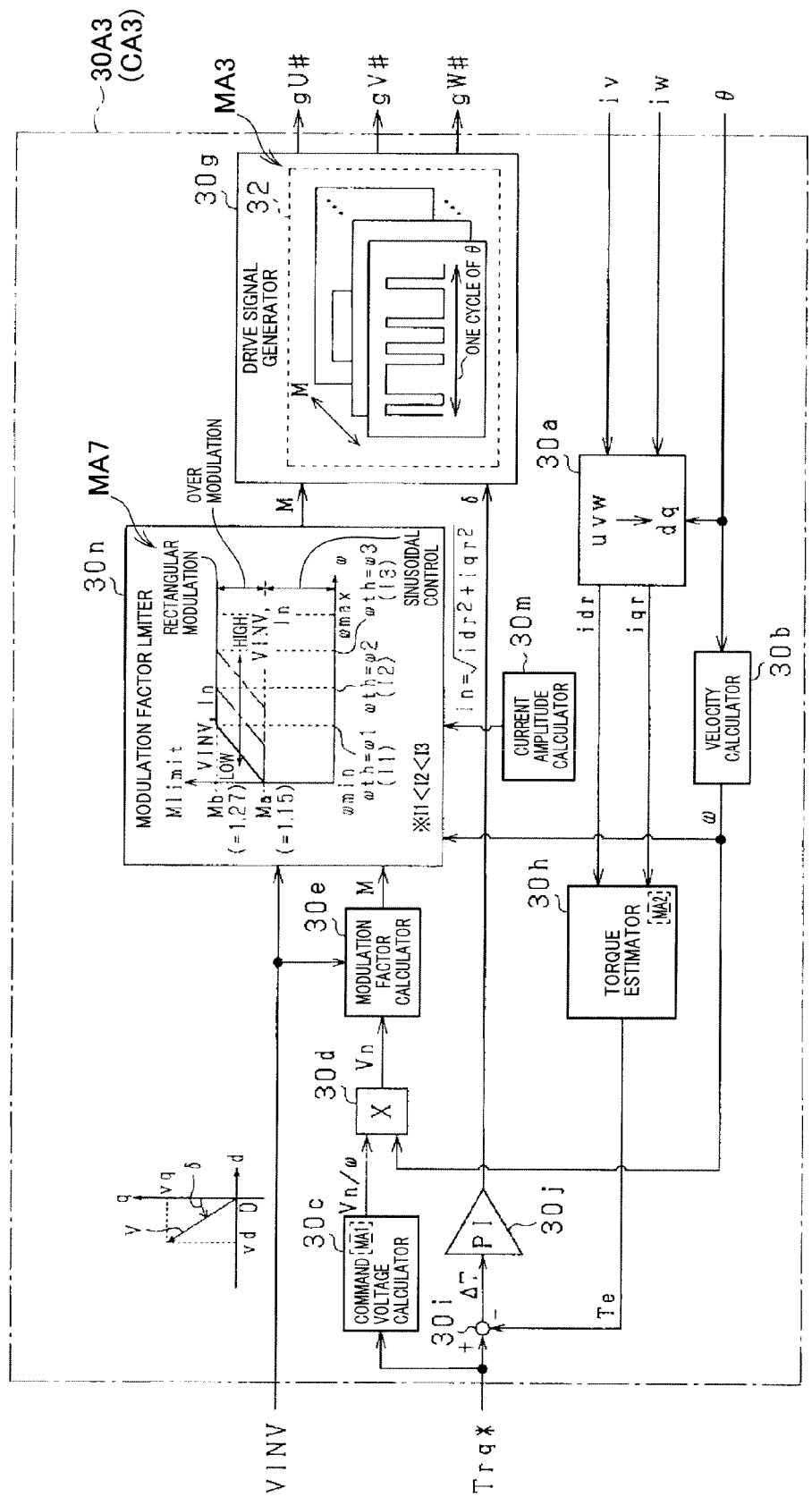
FIG. 5A is a block diagram schematically illustrating an example of the specific structure of a controller of a control apparatus according to a fourth embodiment of the present disclosure.

FIG. 5A schematically illustrates an example of the specific structure of a controller 30A3 according to the fourth embodiment. Like reference characters are assigned to like modules between the controllers 30A2 and 30A3, so that redundant descriptions of the like modules illustrated in FIG. 5A are omitted or simplified.

Referring to FIG. 5A, the controller 30A3 includes a current-amplitude calculator 30m. The current-amplitude calculator 30m is operative to calculate, based on the d-axis and q-axis current components idr and iqr, the amplitude In of the current vector I in accordance with the following equation: $In=\sqrt{idr^2+iqr^2}$. That is, the amplitude In of the current vector I is defined as the square root of the sum of the square of the d-axis component idr and the square of the q-axis component iqr.

To a modulation-factor limiter 30n of the controller 30A3, the amplitude In of the current vector I is input from the request torque input unit 46 in addition to the angular velocity ω and the input voltage VINV or in addition to the angular velocity ω in place of the request torque Trq*.

The modulation-factor limiter 30n is configured to increase the threshold angular velocity $\omega_{th}$ with increase of the amplitude In of the current vector I. Specifically, the modulation-factor limiter 30n is configured to expand, within the angular-velocity possible range $\omega_{min}$ to $\omega_{max}$, a region to limit the modulation factor M calculated by the modulation calculator 30e to the higher side, i.e. to the maximum angular velocity $\omega_{max}$ with increase of the amplitude In of the current vector I. This configuration compensates for the fact that, the greater the amplitude In of the current vector I is, the higher the harmonic voltages included in the output voltage of the inverter 20 are. This might reduce the harmonic impedance of the motor-generator 10, resulting in an increase of the levels of harmonic currents.

For example, the modulation-factor limiter 30n has a map MA7 each in data-table format, in mathematical expression format, and/or program format. The map MA7, which is for example stored in the memory 32b, represents a plurality of upper-limit functions, i.e. correlations, each of which is defined between the variable of the angular velocity ω, the variable of the first upper limit $M1_{limit}$, and the variable of the second upper limit $M2_{limit}$.

That is, the upper-limit functions have respective different values of the threshold angular velocity $\omega_{th}$, and the variable of the threshold angular velocity $\omega_{th}$ correlates with each of a variable of the input voltage VINV and a variable of the amplitude In of the current vector I.

The controller 30A3, i.e. the modulation-factor limiter 30n, performs the following modulation-factor limitation routine illustrated in FIG. 5B at, for example, every preset period.

Specifically, the modulation-factor limiter 30n selects a value of the threshold angular velocity $\omega_{th}$ corresponding to the value of the input voltage VINV and the value of the amplitude In of the current vector I from, for example, the map MA7 in step S30 of FIG. 5B. This operation in step S30 increases the threshold angular velocity $\omega_{th}$ with an increase of the input voltage VINV and an increase of the amplitude In of the current vector I.

Then, the modulation-factor limiter 30n determines one of the upper-limit functions between the angular velocity ω, the first upper limit $M1_{limit}$, and the second upper limit $M2_{limit}$ in step S31.

Next, the modulation-factor limiter 30n retrieves a value of the first upper limit $M1_{limit}$ corresponding to the angular velocity ω from the determined upper-limit function when the angular velocity ω is within the first angular-velocity range $\omega_{min}$-$\omega_{th}$ (see steps S1 and S2), and a value of the second upper limit $M2_{limit}$ corresponding to the angular velocity ω from the determined upper-limit function when the angular velocity ω is within the second angular-velocity range $\omega_{th}$-$\omega_{max}$ (see steps S1 and S3). Note that, in step S2 according to the fourth embodiment, the map MA7 is used in place of the map MA4.

Particularly, in the fourth embodiment, each of the upper-limit functions is designed to satisfy the following requirements:

the minimum value of the first upper limit $M1_{limit}$ is fixed to the first specified value Ma; and the rate of change of the first upper limit $M1_{limit}$ per unit angular velocity ω, i.e. the inclination of change of the first upper limit $M1_{limit}$ is constant.

Specifically, FIG. 5A schematically illustrates the first, second, and third upper-limit functions each corresponding to a value of the threshold angular velocity $\omega_{th}$; the value of the threshold angular velocity $\omega_{th}$ for each of the first to third upper-limit functions correlates with a corresponding value of the variable of the amplitude In of the current vector I.

Referring to FIG. 5A, the first upper-limit function has a first value ω1 of the threshold angular velocity $\omega_{th}$ correlating with a first value I1 of the amplitude In of the current vector I. The second upper-limit function has a second value ω2 of the threshold angular velocity $\omega_{th}$ correlating with a second value I2 of the amplitude In of the current vector I. The third upper-limit function has a third value ω3 of the threshold angular velocity $\omega_{th}$ correlating with a third value I3 of the amplitude In of the current vector I. The first to third values ω1 to ω3 of the threshold angular velocity $\omega_{th}$ have a correlation that the third value ≥3 is higher than the second value ω2 that is higher than the first value ω1, which is expressed by ω1<ω2<ω3. Similarly, the first to third values I1 to I3 of the amplitude In of the current vector I have a correlation that the third value I3 is higher than the second value I2 that is higher than the first value I1, which is expressed by I1<I2<I3.

In the block 30n of FIG. 5A, the first upper-limit function is represented by a solid line, the second upper-limit function is represented by a dashed-dot line, and the third upper-limit function is represented by two-dot chain line.

Other functions of the control apparatus CA3 according to the fourth embodiment are substantially identical to those of the control apparatus CA2 according to the third embodiment.

As described above, the control apparatus CA3 according to the fourth embodiment is configured to increase the threshold angular velocity angular velocity $\omega_{th}$ with increase of the amplitude In of the current vector I. This configuration prevents an increase of the levels of harmonic currents due to an increase of the amplitude In of the current vector I. This results in further improvement of the ability and stability of the control apparatus CA 3 to control the output torque of the motor-generator 10 in addition to the aforementioned advantages achieved by the control apparatus CA2 according to the second embodiment.

In addition, the control apparatus CA3 uses the amplitude In of the current vector I that is a parameter indicative of currents actually flowing in the motor-generator 10 in order to set the upper limit $M_{limit}$ of the modulation factor M. This properly determines whether harmonic currents increase, thus increasing the accuracy of setting the upper limit $M_{limit}$ of the modulation factor M. This results in further improvement of the ability and stability of the control apparatus CA3 to control the output torque of the motor-generator 10.

Fifth Embodiment

A control apparatus CA4 for the motor-generator 10 according to a fifth embodiment of the present disclosure will be described with reference to FIG. 6.

The structure and/or functions of the control apparatus CA4 according to the fifth embodiment are different from the control apparatus CA according to the first embodiment by the following points. So, the different points will be mainly described hereinafter.

Figure 6A:
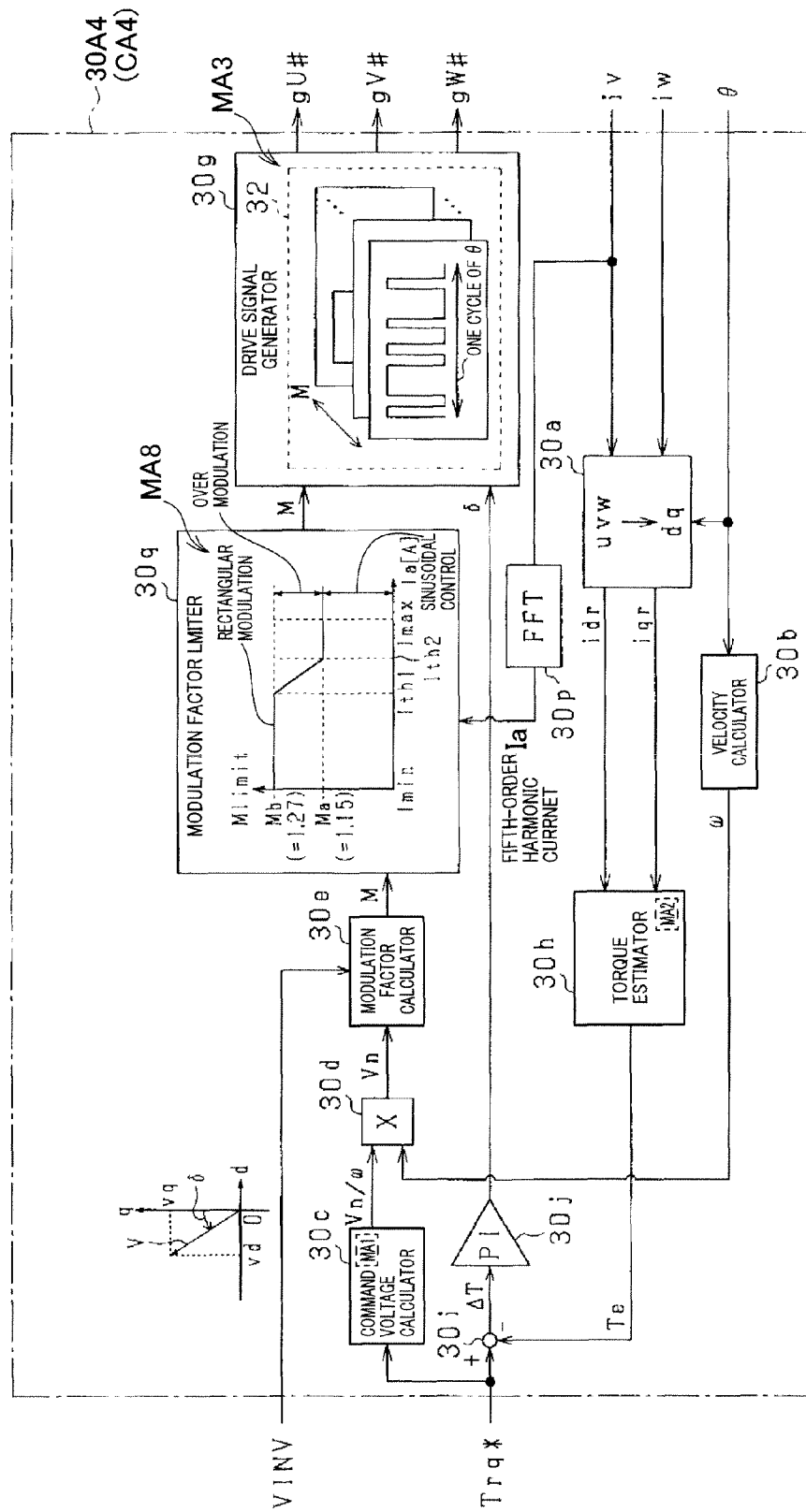
FIG. 6A is a block diagram schematically illustrating an example of the specific structure of a controller of a control apparatus according to a fifth embodiment of the present disclosure.

The control apparatus CA4 according to the fifth embodiment includes a harmonic-current detector 30p, labeled by FFT in FIG. 6A. The harmonic-current detector 30p is operative to receive, for example, the instantaneous V-phase current iv, and perform a known FFT (Fast Fourier Transform) analysis on the instantaneous V-phase current iv, thus extracting the fifth-order harmonic current as a specified-order harmonic current included in the instantaneous V-phase current iv.

The harmonic-current detector 30p is operative to detect an RMS value and/or amplitude of the fifth-order harmonic current as a detected harmonic current Ia, and output the detected harmonic current Ia to a modulation-factor limiter 30q.

In the fifth embodiment, the harmonic-current detector 30p uses the instantaneous V-phase current iv, but can use the instantaneous W-phase current iw.

The modulation-factor limiter 30q is operative to set the upper limit $M_{limit}$ based on the detected harmonic current Ia.

In the fifth embodiment, a possible range which the detected harmonic current Ia can take while the motor-generator 10 is running is previously determined. The possible range, referred to as a harmonic-current range, is defined between a minimum current level $I_{min}$ and a maximum current level $I_{max}$ inclusive.

Within the harmonic-current range, a first threshold current level $I_{th1}$ is previously determined. A range higher than the first threshold current level $I_{th1}$ and equal to or lower than the maximum current level $I_{max}$ is defined as a first harmonic-current range. A range equal to or higher than the minimum current level $I_{min}$ and equal to or lower than the first threshold current level $I_{th1}$ is defined as a second harmonic-current range.

Under the definition, the upper limit $M_{limit}$ is determined individually for each of the first harmonic-current range $I_{th1}$-$I_{max}$ and the second harmonic-current range $I_{min}$-$I_{th1}$.

Specifically, as the upper limit $M_{limit}$ for the second harmonic-current range $I_{min}$-$I_{th1}$, the second specified value Mb is determined. As the upper limit $M_{limit}$ for the first harmonic-current range $I_{th1}$-$I_{max}$, a value lower than the second specified value Mb is determined. The value of the upper limit $M_{limit}$ for the first harmonic-current range $I_{th1}$-$I_{max}$ will be referred to as a first upper limit $M1_{limit}$ and the value of the upper limit $M_{limit}$ for the second harmonic-current range $I_{min}$-$I_{th1}$ will be referred to as a second upper limit $M2_{limit}$.

For example, the modulation-factor limiter 30q has a map MA8 in data-table format, in mathematical expression format, and/or program format. The map MA8, which is for example stored in the memory 32b, includes a function, i.e. correlation, of the variable of the upper limit $M_{limit}$ with respect to the variable of the detected harmonic current Ia. The modulation-factor limiter 30q can retrieve a value of the first upper limit $M1_{limit}$ corresponding to the detected harmonic current Ia when the detected harmonic current Ia is within the first harmonic-current range $I_{th1}$-$I_{max}$. In addition, the modulation-factor limiter 30q can retrieve a value of the second upper limit $M2_{limit}$ corresponding to the detected harmonic current Ia when the detected harmonic current Ia is within the second harmonic-current range $I_{min}$-$I_{th1}$.

Particularly, the modulation-factor limiter 30q is configured to reduce the first upper limit $M1_{limit}$ with an increase of the detected harmonic current Ia.

In addition, a second threshold current level $I_{th2}$ is previously determined within the first harmonic-current range $I_{th1}$-$I_{max}$. The modulation-factor limiter 30q is configured to set the first upper limit $M1_{limit}$ to the first specified value Ma when the detected harmonic current Ia is equal to or higher than the second threshold current level $I_{th2}$ within the first harmonic-current range $I_{th1}$-$I_{max}$. That is, the modulation-factor limiter 30q is configured to disable execution of over-modulation control when the detected harmonic current Ia is equal to or higher than the second threshold current level $I_{th2}$ within the first harmonic-current range $I_{th1}$-$I_{max}$.

For example, in the fifth embodiment, the first upper limit $M1_{limit}$ when the detected harmonic current Ia is a value adjacent to the first threshold current level $I_{th1}$ is set to a corresponding value adjacent to the second specified value Mb. The first upper limit $M1_{limit}$ when the detected harmonic current Ia is the second threshold current level $I_{th2}$ is set to the first specified value Ma. Thus, the first upper limit $M1_{limit}$ decreases, for example linearly, from the value adjacent to the second specified value Mb to the first specified value Ma with decrease of the detected harmonic current Ia from the value adjacent to the first threshold harmonic current level $I_{th1}$ to the second threshold current level $I_{th2}$.

In contrast, while the detected harmonic current Ia is within the second harmonic-current range $I_{min}$-$I_{th1}$, the second upper limit $M2_{limit}$ is constantly set to the second specified value Mb.

The change of the upper limit $M_{limit}$ depending on the detected harmonic current Ia used by the modulation-factor limiter 30q is illustrated as a function of the upper limit $M_{limit}$ to the detected harmonic current Ia previously determined in the map MA8 (see FIG. 6A).

Specifically, the controller 30A4, i.e. the modulation-factor limiter 30q, performs the following modulation-factor limitation routine illustrated in FIG. 6B at, for example, every preset period.

The modulation-factor limiter 30q determines whether the detected harmonic current Ia is within the first harmonic-current range $I_{th1}$-$I_{max}$, i.e. is higher than the first threshold current level $I_{th1}$ in step S41 of FIG. 6B.

When it is determined that a value of the detected harmonic current Ia is within the first harmonic-current range $I_{th1}$-$I_{max}$ (YES in step S41), the modulation-factor limiter 30q determines whether the value of the detected harmonic current Ia is equal to or higher than the second threshold current level $I_{th2}$ in step S42.

When it is determined that the value of the detected harmonic current Ia is equal to or higher than the second threshold current level $I_{th2}$ (YES in step S42), the modulation-factor limiter 30q selects, as the upper limit $M_{limit}$, the first specified value Ma as the first upper limit $M1_{limit}$ independently of the value of the detected harmonic current Ia in step S43.

Thus, the modulation-factor limiter 30q limits the modulation factor M calculated by the modulation-factor calculator 30e to the first specified value Ma as the first upper limit $M1_{limit}$, thus limiting over-modulation control in step S44.

Otherwise, when it is determined that the value of the detected harmonic current Ia is lower than the second threshold current level $I_{th2}$ (NO in step S42), the modulation-factor limiter 30q selects, as the upper limit $M_{limit}$, the first upper limit $M1_{limit}$ lower than the second specified value Mb (1.27) in step S45. Specifically, in step S45, the modulation-factor limiter 30q retrieves, from the map MA8, a value of the first upper limit $M1_{limit}$ corresponding to the value of the detected harmonic current Ia.

Thus, the modulation-factor limiter 30q limits the modulation factor M calculated by the modulation-factor calculator 30e to the value of the first upper limit $M1_{limit}$ corresponding to the value of the detected harmonic current Ia in step S46.

Otherwise, when it is determined that the value of the detected harmonic current Ia is within the second harmonic-current range $I_{min}$-$I_{th1}$ (NO in step S41), the modulation-factor limiter 30q selects, as the upper limit $M_{limit}$, the second specified value Mb (1.27) as the second upper limit $M2_{limit}$ independently of the value of the detected harmonic current Ia in step S47.

Thus, the modulation-factor limiter 30q limits the modulation factor M calculated by the modulation-factor calculator 30e to the value of the second upper limit $M2_{limit}$ in step S48. This provides over-modulation control of the output voltage of the inverter INV without limitation thereof.

In the fifth embodiment, the operations in steps S41, S42, S43, S45, and S47 serve as, for example, an upper limit setter according to the present disclosure, and the operations in steps S44, S46, and S48 serve as, for example, a modulation-factor limiter according to the present disclosure.

As described above, the control apparatus CA according to the fifth embodiment is configured to set the first upper limit $M1_{limit}$ for the first harmonic-current range $I_{th1}$-$I_{max}$ to be lower than the second upper limit $M2_{limit}$ for the second harmonic-current range $I_{min}$-$I_{th1}$.

This configuration limits the modulation factor M to the value of the first upper limit $M1_{limit}$ corresponding to the value of the detected harmonic current Ia or the first specified value Ma even if:

the value of the modulation factor M calculated by the modulation-factor calculator 30e is higher than the value of the first upper limit $M1_{limit}$ corresponding to the value of the detected harmonic current Ia; or the value of the modulation factor M calculated by the modulation-factor calculator 30e is higher than the first specified value Ma.

This limits over-modulation control of the inverter output voltage to thereby limit the command amplitude value Vn. This results in reduction of the levels of harmonic currents when the detected harmonic current Ia is within the first harmonic-current range $I_{th1}$-$I_{max}$, thus improving the ability and stability of the control apparatus CA4 to control the output torque of the motor-generator 10.

Sixth Embodiment

A control apparatus CA5 for the motor-generator 10 according to a sixth embodiment of the present disclosure will be described with reference to FIG. 7.

The structure and/or functions of the control apparatus CA5 according to the sixth embodiment are different from the control apparatus CA according to the first embodiment by the following points. So, the different points will be mainly described hereinafter.

The control apparatus CA5 according to the sixth embodiment is configured to perform current feedback control using current as a direct controlled variable in place of the aforementioned torque feedback control using torque as a direct controlled variable. Specifically, the control apparatus CA5 is configured to perform on-off operations of the switching elements S*# to thereby match actual currents flowing in the motor-generator 10 with current parameters required to obtain the request torque Trq*. Specifically, the control apparatus CA5 uses currents actually flowing in the motor-generator 10 as direct controlled variables to control the output torque of the motor-generator 10 as a final controlled variable.

Figure 7:
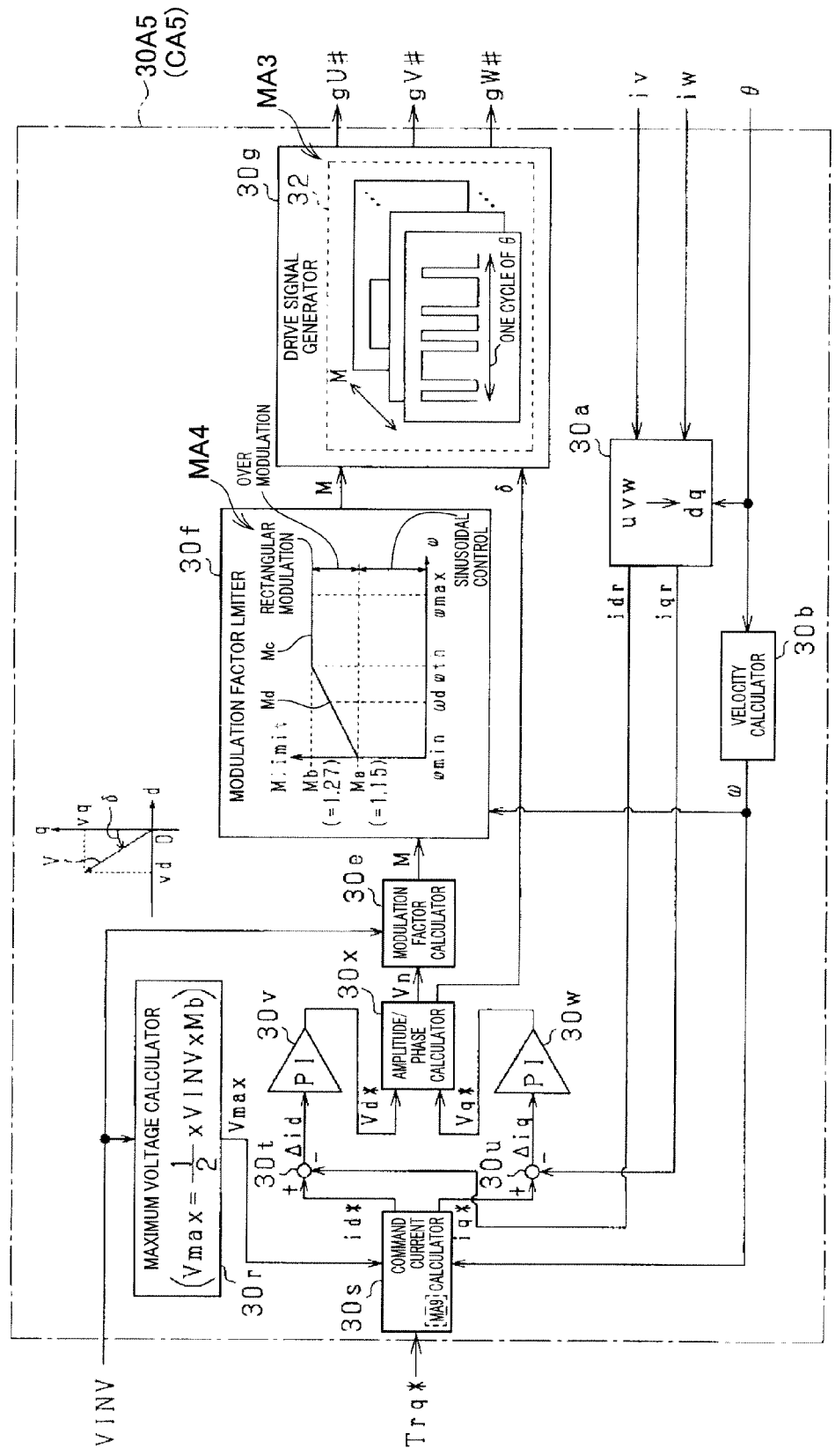
FIG. 7 is a block diagram schematically illustrating an example of the specific structure of a controller of a control apparatus according to a sixth embodiment of the present disclosure.

FIG. 7 schematically illustrates an example of the specific structure of the controller 30A5 for performing the current feedback control. Like reference characters are assigned to like modules between the controllers 30 and 30A5, so that redundant descriptions of the like modules illustrated in FIG. 7 are omitted or simplified.

Referring to FIG. 7, the controller 30A5 includes a maximum voltage calculator 30r, a command current calculator 30s, a d-axis deviation calculator 30t, and a q-axis deviation calculator 30u. The controller 30A5 also includes a d-axis command voltage calculator 30v, a q-axis command voltage calculator 30w, and an amplitude/phase calculator 30x.

The maximum voltage calculator 30r is operative to multiply the half of the input voltage VINV by the second specified value Mb to thereby calculate a maximum voltage Vmax. The maximum voltage Vmax represents an upper limit of a voltage range within which the command amplitude voltage Vn can fall based on the actual input voltage VINV.

The command current calculator 30s is operative to calculate, based on the request torque Trq*, the angular velocity ω, and the maximum voltage Vmax, a command d-axis current component id* and a command q-axis current component iq* in the d-q coordinate system of the rotor 10a. For example, the command current calculator 30a has a map MA9 in data-table format, in mathematical expression format, and/or program format. The map MA9, which is for example stored in the memory 32b, represents:

a function, i.e. a correlation, of the command d-axis current component id* with respect to the variable of the request torque Trq*, the variable of the angular velocity ω, and the variable of the maximum voltage Vmax; and a function, i.e. a correlation, of the variable of the command q-axis current component iq* with respect to the variable of the request torque Trq*, the variable of the angular velocity ω, and the variable of the maximum voltage Vmax.

The command current calculator 30s can retrieve, from the map MA9, a value of the command d-axis current component id* corresponding to a value of the request torque Trq*, a value of the variable of the angular velocity ω, and a value of the variable of the maximum voltage Vmax. The command current calculator 30a can also retrieve, from the map MA9, a value of the command q-axis current component iq* corresponding to a value of the request torque Trq*, a value of the variable of the angular velocity ω, and a value of the variable of the maximum voltage Vmax.

The d-axis deviation calculator 30t is operative to subtract, from the command d-axis current component id*, the d-axis current component idr to thereby calculate a d-axis deviation Δid.

Similarly, the q-axis deviation calculator 30u is operative to subtract, from the command q-axis current component iq*, the q-axis current component iqr to thereby calculate a q-axis deviation Δiq.

The d-axis command voltage calculator 30v is operative to calculate, based on the d-axis deviation Δid, a d-axis command voltage vd* as a feedback manipulated variable for feedback controlling the d-axis current component idr to be matched with the command d-axis current component id*.

Specifically, in the sixth embodiment, the d-axis command voltage calculator 30v calculates the d-axis command voltage vd* using a proportional gain term and an integral gain term of a PI feedback control algorithm (PI algorithm) using the d-axis deviation Δid as its input.

In the PI algorithm, the d-axis command voltage vd* is expressed based on the proportional gain term and integral gain term.

The proportional gain term for the d-axis command voltage vd* contributes to change in the d-axis command voltage vd* in proportion to the d-axis deviation Δid from a target value of zero.

The integral gain term is proportional to an accumulated offset of instantaneous values of the d-axis deviation Δid over time to reset the accumulated offset (steady-state deviation) over time to zero.

Similarly, the q-axis command voltage calculator 30w is operative to calculate, based on the q-axis deviation Δiq, a q-axis command voltage vq* as a feedback manipulated variable for feedback controlling the q-axis current component iqr to be matched with the command q-axis current component iq*.

The phase/amplitude calculator 30x is operative to calculate, based on the d-axis command voltage vd* and the q-axis command voltage vq*, the command amplitude value Vn of the output voltage vector V. The phase/amplitude calculator 30x is also operative to calculate, based on the d-axis command voltage vd* and the q-axis command voltage vq*, the phase δ of the output voltage vector V of the inverter 20 in the d-q coordinate system.

The command amplitude value Vn of the output voltage vector V is input to the modulation-factor limiter 30f, and the phase δ of the output voltage vector V of the inverter 20 is input to the drive signal generator 30g.

In the sixth embodiment, the maximum voltage calculator 30r, command current calculator 30s, d-axis deviation calculator 30t, q-axis deviation calculator 30u, d-axis command voltage calculator 30v, q-axis command voltage calculator 30w, and amplitude/phase calculator 30x serve as, for example, a command voltage calculator, an amplitude calculator and a phase calculator according to the present disclosure.

As described above, the control apparatus 30A5 performs the current feedback control using current as a direct controlled variable in place of the aforementioned torque feedback control using torque as a direct controlled variable. Thus, the structure and functions of the modulation-factor limiter 30f of the control apparatus 30A5 are identical to those of the modulation-factor limiter 30f of the control apparatus 30 according to the first embodiment, resulting in the control apparatus CA5 achieving the advantages achieved by the control apparatus CA.

Seventh Embodiment

A control apparatus CA6 for the motor-generator 10 according to a seventh embodiment of the present disclosure will be described with reference to FIG. 7.

The structure and/or functions of the control apparatus CA6 according to the seventh embodiment are different from the control apparatus CA according to the first embodiment by the following points. So, the different points will be mainly described hereinafter.

The control apparatus CA6 according to the seventh embodiment is configured to perform a task of generating the drive signals g*# such that the levels of the harmonic voltages are equal to or lower than the predetermined allowable upper-limit level; the task is different from the modulation-factor limiting tasks set forth above.

Figure 8:
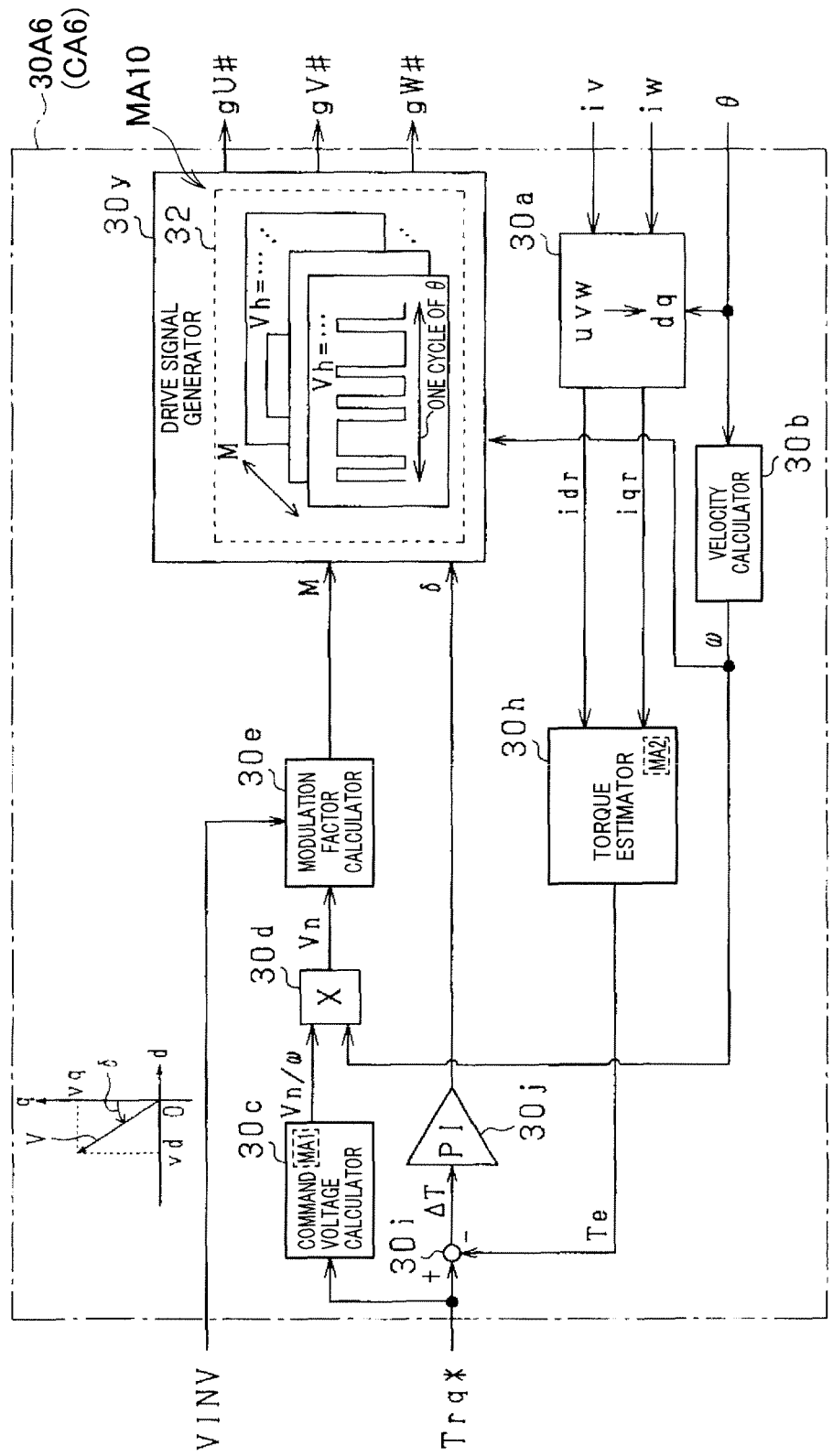
FIG. 8 is a block diagram schematically illustrating an example of the specific structure of a controller of a control apparatus according to a seventh embodiment of the present disclosure.

FIG. 8 schematically illustrates an example of the specific structure of the controller 30A6. Like reference characters are assigned to like modules between the controllers 30 and 30A6, so that redundant descriptions of the like modules illustrated in FIG. 8 are omitted or simplified.

Referring to FIG. 8, the controller 30A6 includes no modulation-factor limiter 30f. For this reason, the modulation factor M calculated by the modulation-factor calculator 30e is input directly to a drive signal generator 30y. In addition to the modulation factor M, the angular velocity ω of the rotor 10a is input to the drive signal generator 30y.

The drive signal generator 30y includes a MA10 in data-table format, in mathematical expression format, and/or program format; the map MA10 is for example stored in the memory 32b.

The map MA10 includes, as map data, a predetermined waveform of the reference drive signal, i.e. a predetermined on-off pulse pattern thereof, for each of the specified values of the modulation factor M. Each of the on-off pulse patterns correlating with a corresponding one of the specified values of the modulation factor M also correlates with a corresponding normalized harmonic voltage Vh. The on-off pulse pattern of the reference drive signal is prepared for one cycle of the rotation angle θ, i.e. for 360 degrees of the rotation angle θ, of the rotor 10a.

The normalized harmonic voltage Vh correlating with each of the on-off pulse patterns represents, for example, a normalized RMS value of one or more harmonic voltages included in the output voltage of the inverter 20 when the switching elements S*# are driven based on a corresponding one of the on-off pulse patterns whose on-off timings are adjusted by the phase δ of the output voltage vector V.

For example, dividing the RMS value of a representative order harmonic voltage, such as a sixth-order or twelfth-order harmonic voltage, included in the output voltage of the inverter 20 by the half of the input voltage VINV generates the normalized RMS value of the representative order harmonic voltage as the normalized harmonic voltage Vh.

As another example, dividing the RMS values of the sixth-order and twelfth-order harmonic voltages, included in the output voltage of the inverter 20, by the half of the input voltage VINV generates the normalized RMS values of the sixth-order and twelfth-order harmonic voltages. Then, calculating the sum of the normalized RMS values of the sixth-order and twelfth-order harmonic voltages generates the normalized harmonic voltage Vh.

As a further example, dividing the RMS value of each of the harmonic voltages included in the output voltage of the inverter 20 by the half of the input voltage VINV generates the normalized RMS value of each of the harmonic voltages included in the output voltage of the inverter 20. Then, calculating the sum of the normalized RMS values generates the normalized harmonic voltage Vh.

Note that the reason why each of the on-off pulse patterns correlates with a corresponding normalized harmonic voltage Vh is that the on-off pulse pattern specifies a corresponding value of the modulation factor M, and the determined value of the modulation factor M specifies a fundamental voltage included in the output voltage of the inverter 20. The determined fundamental voltage specifies harmonic voltages based on the fundamental voltage.

Figure 9:
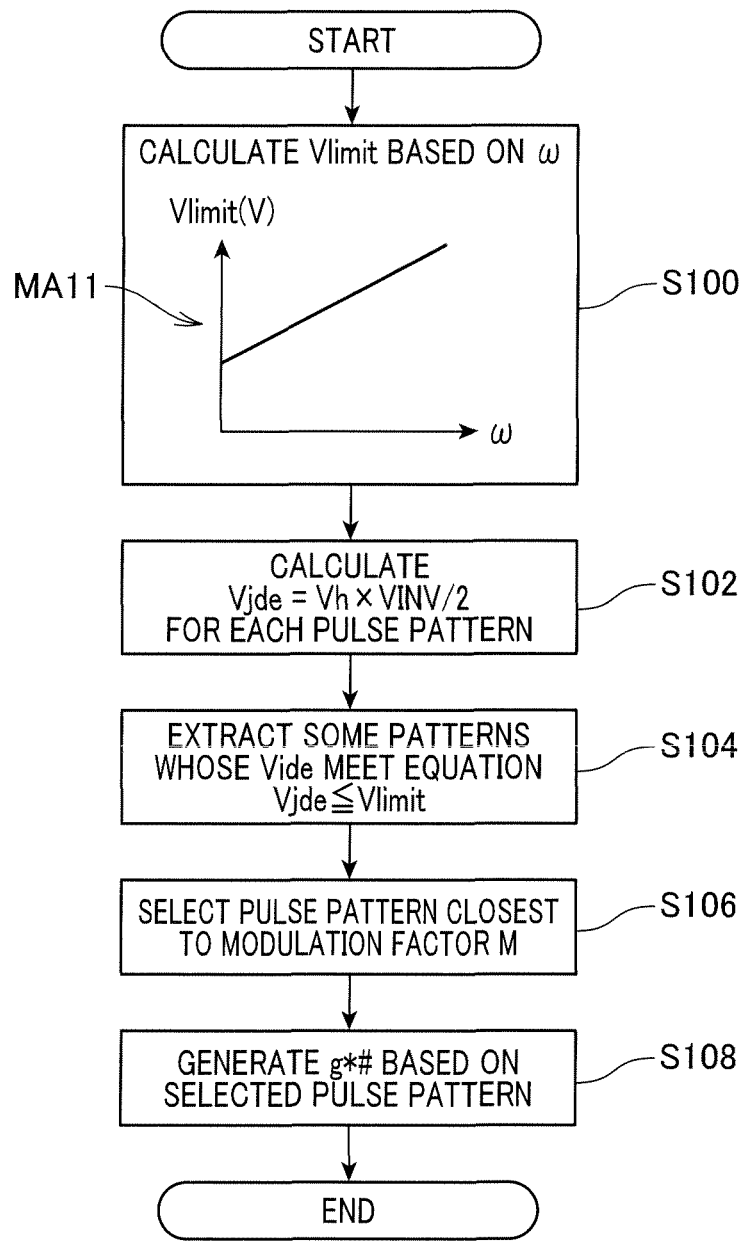
FIG. 9 is a flowchart schematically illustrating a pulse-pattern selection routine to be executed by the controller according to the seventh embodiment.

The controller 30A6, i.e. the driving signal generator 30y, performs the following pulse-pattern selection routine illustrated in FIG. 9 at, for example, every preset period.

When launching the pulse-pattern selection routine, the driving signal generator 30y determines an allowable upper-limit harmonic voltage $V_{limit}$ based on the angular velocity ω of the rotor 10a in step S100. Specifically, in step S100, the driving signal generator 30y determines an allowable upper-limit harmonic voltage $V_{limit}$ such that, the higher the angular velocity ω, the higher the allowable upper-limit harmonic voltage $V_{limit}$. The allowable upper-limit harmonic voltage $V_{limit}$ is a parameter having the same technical significance of the predetermined allowable upper-limit level used in the first embodiment.

For example, the driving signal generator 30y has a map MA11 in data-table format, in mathematical expression format, and/or program format. The map MA11, which is for example stored in the memory 32b, includes a function, i.e. a correlation, of the variable of the allowable upper-limit harmonic voltage $V_{limit}$ with respect to the variable of the angular velocity ω. The driving signal generator 30y can retrieve, from the map MA11, a value of the allowable upper-limit harmonic voltage $V_{limit}$ corresponding to the angular velocity ω of the rotor 10a, thus determining the allowable upper-limit harmonic voltage $V_{limit}$ in step S100.

Next, the driving signal generator 30y multiplies, for each of the on-off pulse patterns stored in the memory 32b, a corresponding one of the normalized harmonic voltage Vh correlating therewith by the half of the input voltage VINV, thus calculating a determination voltage Vjdg for each of the on-off pulse patterns in step S102.

Following the operation in step S102, the driving signal generator 30y extracts, from all the on-off pulse patterns, some on-off pulse patterns each of which has the determination voltage Vjdg higher than the allowable upper-limit harmonic voltage $V_{limit}$ in step S104. Specifically, the operation in step S104 serves as means for eliminating, from all the on-off pulse patterns, some on-off pulse patterns whose determination voltages Vjdg are higher than the allowable upper-limit harmonic voltage $V_{limit}$. This limits all the on-off pulse patterns to on-off pulse patterns whose determination voltages Vjdg are equal to or lower than the allowable upper-limit harmonic voltage $V_{limit}$; the limited on-off pulse patterns are candidate pulse patterns used for generating the driving signals g*#. This makes it possible to limit generation of the driving signals g*#. For example, in step S104, the driving signal generator 30y mainly eliminates, from all the on-off pulse patterns, some on-off pulse patterns whose corresponding specified values of the modulation factor M exceed the first specified value Ma. Specifically, some on-off pulse patterns mainly eliminated from all the on-off pulse patterns are to control over-modulation of the output voltage of the inverter 20.

Next, the driving signal generator 30y selects one of the candidate pulse patterns extracted in step S104; the selected candidate pulse pattern corresponds to or is adjacent to the modulation factor M calculated by the modulation-factor calculator 30a in all the candidate pulse patterns in step S106. Next, in step S108, the driving signal generator 30y generates the drive signals g*# based on the on-off pulse pattern selected in step S106, and thereafter, the driving signal generator 30y terminates the pulse-pattern selection routine.

In the seventh embodiment, the operations in steps S100, S102, S104, and S106 serve as, for example, a limiter according to the present disclosure. The operation in step S108 serves as, for example a driving signal lgenerator according to the present disclosure.

As described above, the control apparatus CA6 according to the seventh embodiment is configured to eliminating, from all the on-off pulse patterns, some on-off pulse patterns whose determination voltages Vjdg are higher than the allowable upper-limit harmonic voltage $V_{limit}$; the eliminated patterns may cause an increase of the levels of harmonic currents flowing in the motor-generator 10. This configuration therefore improves the ability and stability of the control apparatus CA6 to control the output torque of the motor-generator 10, thus similarly achieving the aforementioned advantages achieved by the control apparatus CA according to the first embodiment.

Each of the first to seventh embodiments can be modified as follows.

The control apparatus according to each of the first to seventh embodiments uses the angular velocity ω, or a level of one or more harmonic currents, such as the fifth-order harmonic current, as a parameter indicative of change of a harmonic current, but the present disclosure is not limited thereto. Specifically, the control apparatus according to each of the first to seventh embodiments can use both the angular velocity ω, and the level of one or more harmonic currents as a parameter indicative of change of a harmonic current. In place of the angular velocity ω of the rotor 10a, the rotational velocity of the rotor 10a can be used. In this modification, the rotational angle sensor 44 can monitor the rotational velocity of the rotor 10a.

The control apparatus CA according to the first embodiment is configured to set the first upper limit $M1_{limit}$ for the first angular-velocity range $\omega_{min}$-$\omega_{th}$ to be lower than the second upper limit $M2_{limit}$ for the second angular-velocity range $\omega_{th}$-$\omega_{min}$. As an example, the control apparatus CA according to the first embodiment is configured to linearly decreases the first upper limit upper limit $M1_{limit}$ with a decrease of the angular velocity to during the first angular-velocity range $\omega_{min}$-$\omega_{th}$. The present disclosure is however not limited to this configuration.

Specifically, the control apparatus CA can be configured to fix the first upper limit upper limit $M1_{limit}$ for the first angular-velocity range $\omega_{min}$-$\omega_{th}$ to the first specified value Ma. This disables over-modulation control of the output voltage of the inverter 20 as long as the angular velocity ω is within the first angular-velocity range $\omega_{min}$-$\omega_{th}$. The control apparatus CA can also be configured to change the first upper limit $M1_{limit}$ using a quadratic or cubic function in place of a linear function as illustrated in FIG. 2A.

The control apparatus CA according to the first embodiment is configured to increase the threshold angular velocity $\omega_{th}$ with an increase of at least one of the input voltage VINV, the request torque Trq*, and the detected harmonic current Ia to thereby increase limitation of the modulation factor by the first upper limit. However, the present disclosure is not limited to this structure. Specifically, the control apparatus CA can be configured to, while maintaining unchanged the threshold angular velocity $\omega_{th}$, increase the inclination or rate of change of the first upper limit $M1_{limit}$ for the first angular-velocity range $\omega_{min}$-$\omega_{th}$ with an increase of at least one of the input voltage VINV, the request torque Trq*, and the detected harmonic current Ia.

The control apparatus CA according to the fourth embodiment uses amplitude In of the current vector I as a current parameter positively correlating with a current flowing in the motor-generator 10, but the present disclosure is not limited thereto. Specifically, the control apparatus CA can use an RMS value and/or an amplitude of a specified-order current component included in a phase current, such as a V-phase current iv or a W-phase current iw, as a current parameter positively correlating with a current flowing in the motor-generator 10. As the specified-order current component, a fundamental component included in a phase current can be used. For example, the control apparatus CA can extract the specific-order current component from a phase current using, for example, an FFT analysis set forth above. The control apparatus CA can also use an RMS value and/or an amplitude of a specified-order current component included in at least one of a d-axis current component idr and a q-axis current component iqr in the d-q coordinate system as a current parameter positively correlating with a current flowing in the motor-generator 10.

The control apparatus CA5 according to the sixth embodiment can determine each of the first upper limit $M1_{limit}$ and the second upper limit $M2_{limit}$ using the amplitude In of the current vector I or the amplitude of a command current vector based on the d-axis current component idr and a q-axis current component iqr in the d-q coordinate system.

Each of the control apparatuses CA2 and CA3 according to the third and fourth embodiments can determine each of the first upper limit $M1_{limit}$ and the second upper limit $M2_{limit}$ without using the input voltage VINV.

In the fifth embodiment, the harmonic-current detector 30p serves as a parameter monitor for monitoring, as a parameter indicative of change of a harmonic current, the level of a harmonic current. Specifically, the harmonic-current detector 30p is configured to detect an RMS value and/or amplitude of the fifth-order harmonic current as the level of the fifth-order harmonic current included in a phase current. However, the present disclosure is not limited to this configuration.

For example, the harmonic-current detector 30p can detect an RMS value and/or amplitude of at least one of the seventh-order harmonic current, the eleventh-order harmonic current, and the thirteenth-order harmonic current.

The harmonic-current detector 30p can detect an RMS value and/or amplitude of at least one of harmonic currents included in at least one of a d-axis current component idr and a q-axis current component iqr in the d-q coordinate system. In this case, the harmonic-current detector 30p can detect an RMS value and/or amplitude of a sixth-order or twelfth-order harmonic component included in at least one of the d-axis current component idr and the q-axis current component iqr.

The control apparatus CA5 according to the sixth embodiment can be configured to determine the first upper limit $M1_{limit}$ and the second upper limit $M2_{limit}$ using one of the methods described in the second, third, fourth, fifth, and seventh embodiments.

In the seventh embodiment, the drive signal generator 30y uses, as a reference voltage level of at least one harmonic voltage, a normalized harmonic voltage, obtained by dividing an RMS value of the at least one harmonic voltage by the half of the input voltage VINV. However, the present disclosure is not limited to this configuration. Specifically, the drive signal generator 30y can use, as a reference voltage level of at least one harmonic voltage, a normalized harmonic voltage, obtained by dividing amplitude of the at least one harmonic voltage by the half of the input voltage VINV.

The map MA10 of the memory, serving as a storage, 32b stores therein each of the on-off pulse patterns correlating with a corresponding one of the specified values of the modulation factor M, but the present disclosure is not limited thereto. Specifically, plural on-off pulse patterns can be used for implementing each of the specified values of the modulation factor M.

For this reason, the map MA10 can store therein each of the on-off pulse patterns such that one of the specified values of the modulation factor M correlates with plural on-off pulse patterns. In this modification, plural on-off pulse patterns correlating with one of the specified values of the modulation factor M respectively cause different numbers of switching of the switching elements S*# for one cycle of the rotation angle θ, so that the plural on-off pulse patterns have different levels of switching loss.

Thus, the map MA10 can store the on-off pulse patterns such that each of the on-off pulse patterns correlates with:

a corresponding one of the specified values of the modulation factor M;

a corresponding normalized harmonic voltage Vh; and information indicative of corresponding switching loss, such as the corresponding number of switching.

In this modification, in step S104, the driving signal generator 30y extracts, from all the on-off pulse patterns, some on-off pulse patterns each of which has:

the determination voltage Vjdg higher than the allowable upper-limit harmonic voltage $V_{limit}$; and the corresponding number of switching operations is lower than a predetermined target number of switching operations.

The map MA11 can include a function of the variable of the allowable upper-limit harmonic voltage $V_{limit}$ with respect to the variable of the angular velocity ω and the variable of at least one of: temperature of the rotor 10a, temperature of the stator, and inductance characteristics of the motor-generator 10.

Specifically, the amount of interlinkage flux with respect to the armature windings decreases with an increase of the temperature of the rotor 10a, resulting in easy flow of currents in the motor-generator 10. For this reason, it is preferable that the allowable upper-limit harmonic voltage $V_{limit}$ decrease with an increase of the temperature of the rotor 10a.

The resistance of the three-phase stator windings decreases with an increase of the temperature of the stator, resulting in easy flow of currents in the motor-generator 10. For this reason, it is preferable that the allowable upper-limit harmonic voltage $V_{limit}$ decrease with an increase of the temperature of the stator.

The inductance characteristics of plural motor-generators 10 may vary from each other. The higher one motor-generator 10 is, the less harmonic currents flow in the motor-generator 10. For this reason, it is preferable that the allowable upper-limit harmonic voltage $V_{limit}$ be set depending on the inductance of the motor-generator 10.

In this modification, a temperature sensor TS can be provided to measure the temperature of the rotor 10a and the stator (see the phantom line in FIG. 1; the temperature sensor TS can be eliminated when it is not used). Then, the driving signal generator 30y can retrieve, from the map MA11, a value of the allowable upper-limit harmonic voltage $V_{limit}$ corresponding to: the angular velocity ω of the rotor 10a; a measured temperature of the rotor 10a; a measured temperature of the stator; and the original inductance of the motor-generator 10. This can determine the allowable upper-limit harmonic voltage $V_{limit}$ in step S100.

Each of the drive signal generators 30g and 30y serves as, for example, a generator to select one of on-off pulse patterns to thereby generate the drive signals g*#, but the present disclosure is not limited thereto. Specifically, each of the drive signal generators 30g and 30y can be configured to calculate, as manipulated variables for feedback controlling the output torque to be matched with the request torque Trq*, three-phase sinusoidal command voltages that are shifted by an electric angle of 2π/3 radian in phase from each other. Then, each of the drive signal generators 30g and 30y can be configured to compare in amplitude each of the three-phase sinusoidal command voltages with a carrier signal, such as a triangular carrier signal, to thereby generate the drive signals g*#

The rotational angle θ and/or the angular velocity ω can be estimated based on, for example, actual d-axis and q-axis currents without using the rotational angle sensor 44.

In each of the first to seventh embodiments, the controller is configured to perform torque feedback control or current feedback control to thereby match a controlled variable of the motor-generator with a request value, but the present disclosure is not limited thereto. Specifically, the controller according to each of the first to seventh embodiments can be configured to perform torque feedforward control or current feedforward control to match a controlled variable of the motor-generator with a request value.

A current sensor for measuring an instantaneous U-phase alternating current iu can be provided. This can eliminate the operation for calculating the instantaneous U-phase alternating current iu based on the instantaneous V- and W-phase alternating currents iv and iw.

In each of the first to seventh embodiments, an IPMSM is used as an example of rotary machines, but another type rotary machine, such as an SPMSM (Surface Permanent Magnet Synchronous Motor) or a wound-field synchronous motor can be used. Rotary machines according to the present disclosure are not limited to synchronous machines. Induction machines can be used as rotary machines according to the present disclosure. Various types of rotary machines according to the present disclosure can be installed in various types of vehicles, such as an electric automobile. Rotary machines to which the present disclosure is applied are not limited to a component, such as a main engine, of vehicles. Specifically, rotary machines to which the present disclosure is applied can be installed in electric power steering systems and electrical compressors for air conditioning systems.

In each of the first to fifth, and seventh embodiments, the command-voltage calculator 30c can obtain the command amplitude voltage Vn without normalization of the angular velocity ω, thus inputting the command amplitude voltage Vn to the modulation-factor calculator 30e. This modification can eliminate the velocity multiplier 30d.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a controlled variable of a rotary machine based on an AC voltage supplied to the rotary machine via a switching element of a power converter, the apparatus comprising:

a generator that generates a drive signal including an on-off pattern of the switching element;

a driver that drives, based on the on-off pattern of the drive signal, the switching element;

a parameter monitor that monitors a parameter indicative of change of a harmonic current flowing in the rotary machine based on a harmonic voltage included in the AC voltage; and a limiter that limits, based on the parameter monitored by the parameter monitor, generation of the drive signal by the generator to limit an increase of a level of the harmonic current; wherein:

the rotary machine comprises a rotor rotatable disposed therein;

the parameter monitor monitors, as the parameter, at least one of: a velocity parameter indicative of a rotational speed of the rotor of the rotary machine; and a current parameter indicative of the level of the harmonic current;

the limiter limits, based on at least one of the velocity parameter and the current parameter, generation of the drive signal by the drive signal;

the apparatus further comprises:

an amplitude calculator that calculates, based on a request value for the controlled variable, a command amplitude of an output voltage vector for the power converter in a two-phase rotating coordinate system defined in the rotary machine, the command amplitude of the output voltage vector correlating the request value for the controlled variable;

a phase calculator that calculates, based on the request value for the controlled variable, a phase of the output voltage vector, the phase of the output voltage vector correlating the request value for the controlled variable; and a modulation-factor calculator that calculates, based on an input voltage to the power converter and the command amplitude of the output voltage vector, a modulation factor indicative of a normalized value of the command amplitude of the output voltage vector relative to the input voltage, the parameter monitor monitors, as the velocity parameter, an angular velocity of the rotor of the rotary machine, the angular velocity of the rotor having a possible range from a minimum value to a maximum value, the possible range having a threshold angular velocity therewithin, a first angular-velocity range being defined as a range equal to or higher than the minimum value and lower than the threshold angular velocity, a second angular-velocity range being defined as a range equal to or higher than the threshold angular velocity and equal to or lower than the maximum value;

the limiter comprises:

an upper limit setter that sets a first upper limit of the modulation factor for the first angular-velocity range and a second upper limit of the modulation factor for the second angular-velocity range, the first upper limit of the modulation factor being lower than the second upper limit of the modulation factor; and a modulation-factor limiter that:

limits the modulation factor calculated by the modulation-factor calculator to the first upper limit when the angular velocity of the rotor of the rotary machine is within the first angular-velocity range; and limits the modulation factor calculated by the modulation-factor calculator to the second upper limit when the angular velocity of the rotor of the rotary machine is within the second angular-velocity range; and the generator generates the drive signal based on the modulation factor limited by the modulation-factor limiter and the phase of the output voltage vector calculated by the phase calculator.

2. The apparatus according to claim 1, wherein:
the upper limit setter decreases a value of the upper limit of the modulation factor with a decrease of the angular velocity of the rotor within the first angular-velocity range.

3. The apparatus according to claim 1, wherein:
the upper limit setter increases limitation of the modulation factor by the first upper limit with an increase of the input voltage to the power converter.

4. The apparatus according to claim 3, wherein:
the upper limit setter increases the threshold angular velocity with an increase of the input voltage to the power converter to thereby increase limitation of the modulation factor by the first upper limit.

5. The apparatus according to claim 3, wherein:
the upper limit setter increases limitation of the modulation factor by the first upper limit with an increase of at least one of: the request value; and a current parameter positively correlating with a current, the current flowing in the rotary machine.

6. The apparatus according to claim 1, wherein:
the upper limit setter increases limitation of the modulation factor by the first upper limit with an increase of at least one of: the request value; and a current parameter positively correlating with a current, the current flowing in the rotary machine.

7. The apparatus according to claim 6, wherein:
the upper limit setter increases the threshold angular velocity with an increase of at least one of the request value and the current parameter to thereby increase limitation of the modulation factor by the first upper limit.

8. The apparatus according to claim 1, further comprising:
a torque estimator that estimates, as the controlled variable, output torque of the rotary machine based on a current flowing in the rotary machine, wherein:

the phase calculator calculates the phase of the output voltage vector as a manipulated variable for performing feedback control of the controlled variable to be matched with the request value.

9. The apparatus according to claim 1 wherein:
the controlled variable comprises a first current component and a second current component of a current in the two-phase rotating coordinate system, the current flowing in the rotary machine;

the amplitude calculator calculates the command amplitude of the output voltage vector as a first manipulated variable for performing feedback control of the controlled variable to be matched with the request value; and the phase calculator calculates the phase of the output voltage vector as a second manipulated variable for performing feedback control of the controlled variable to be matched with the request value.

10. The apparatus according to claim 1, wherein the limiter limits generation of the drive signal by the generator while the apparatus is operating in an over-modulation mode.

11. An apparatus for controlling a controlled variable of a rotary machine based on an AC voltage supplied to the rotary machine via a switching element of a power converter, the apparatus comprising:

a generator that generates a drive signal including an on-off pattern of the switching element;

a driver that drives, based on the on-off pattern of the drive signal, the switching element;

a parameter monitor that monitors a parameter indicative of change of a harmonic current flowing in the rotary machine based on a harmonic voltage included in the AC voltage;

a limiter that limits, based on the parameter monitored by the parameter monitor, generation of the drive signal by the generator to limit an increase of a level of the harmonic current;

an amplitude calculator that calculates, based on a request value for the controlled variable, a command amplitude of an output voltage vector for the power converter in a two-phase rotating coordinate system defined relative to the rotary machine, the command amplitude of the output voltage vector correlating with the request value for the controlled variable;

a phase calculator that calculates, based on the request value for the controlled variable, a phase of the voltage output vector, the phase of the output voltage vector correlating with the request value for the controlled variable; and a modulation-factor calculator that calculates, based on an input voltage to the power converter and the command amplitude of the output voltage vector, a modulation factor indicative of a normalized value of the command amplitude of the output voltage vector relative to the input voltage, wherein:

the parameter monitor monitors, as the parameter, the level of the harmonic current, the harmonic current having a possible range from a minimum level to a maximum level, the possible range having a threshold current level therewithin, a first current range being defined as a range higher than the threshold level and equal to or lower than the maximum level, a second current range being defined as a range equal to or higher than the minimum level and equal to or lower than the threshold current level;

the limiter comprises:
an upper limit setter that sets a first upper limit of the modulation factor for the first current range and a second upper limit of the modulation factor for the second current range, the first upper limit of the modulation factor being lower than the second upper limit of the modulation factor; and
a modulation-factor limiter that:
limits the modulation factor calculated by the modulation-factor calculator to the first upper limit when the monitored level of the harmonic current is within the first current range; and
limits the modulation factor calculated by the modulation-factor calculator to the second upper limit when the monitored level of the harmonic current is within the second current range; and
the generator generates the drive signal based on the modulation factor limited by the modulation-factor limiter and the phase of the output voltage vector calculated by the phase calculator.

12. The apparatus according to claim 11, further comprising:
a torque estimator that estimates, as the controlled variable, output torque of the rotary machine based on a current flowing in the rotary machine,
wherein:
the phase calculator calculates the phase of the output voltage vector as a manipulated variable for performing feedback control of the controlled variable to be matched with the request value.

13. The apparatus according to claim 11, wherein:
the controlled variable comprises a first current component and a second current component of a current in the two-phase rotating coordinate system, the current flowing in the rotary machine;
the amplitude calculator calculates the command amplitude of the output voltage vector as a first manipulated variable for performing feedback control of the controlled variable to be matched with the request value; and
the phase calculator calculates the phase of the output voltage vector as a second manipulated variable for performing feedback control of the controlled variable to be matched with the request value.

14. The apparatus according to claim 11, wherein the limiter limits generation of the drive signal by the generator while the apparatus is operating in an over-modulation mode.

15. An apparatus for controlling a controlled variable of a rotary machine based on an AC voltage supplied to the rotary machine via a switching element of a power converter, the apparatus comprising:
a generator that generates a drive signal including an on-off pattern of the switching element;
a driver that drives, based on the on-off pattern of the drive signal, the switching element;
a parameter monitor that monitors a parameter indicative of change of a harmonic current flowing in the rotary machine based on a harmonic voltage included in the AC voltage; and
a limiter that limits, based on the parameter monitored by the parameter monitor, generation of the drive signal by the generator to limit an increase of a level of the harmonic current;
an amplitude calculator that calculates, based on a request value for the controlled variable, a command amplitude of an output voltage vector for the power converter in a two-phase rotating coordinate system defined relative to the rotary machine, the command amplitude of the output voltage vector correlating with the request value for the controlled variable;
a phase calculator that calculates, based on the request value for the controlled variable, a phase of the output voltage vector, the phase of the output voltage vector correlating with the request value for the controlled variable; and
a modulation-factor calculator that calculates, based on an input voltage to the power converter and the command amplitude of the voltage vector, a modulation factor indicative of a normalized value of the command amplitude of the output voltage vector relative to the input voltage,
wherein:
the on-off pattern includes a plurality of on-off patterns;
the rotary machine comprises a rotor rotatably disposed therein;
the parameter monitor monitors, as the parameter, an angular velocity of the rotor of the rotary machine;
the limiter comprises:
an allowable upper-limit voltage setter that sets an allowable upper limit of the harmonic voltage such that the allowable upper limit of the harmonic voltage increases with an increase of the angular velocity of the rotor;
a storage that stores therein each of the plurality of on-off patterns correlating with:
a corresponding value of the modulation factor; and
information indicative of a reference voltage level of one or more higher-order harmonic components included in the AC voltage as the harmonic voltage when the switching element is driven by the corresponding on-off pattern; and
an extractor that extracts one or more on-off patterns from the plurality of on-off patterns when the reference voltage levels correlating with the extracted one or more on-off patterns are equal to or lower than the allowable upper limit of the harmonic voltage; and
the generator:
selects one of the extracted one or more on-off patterns, the selected on-off pattern corresponding to or being adjacent to the modulation factor calculated by the modulation-factor calculator; and generates the drive signal based on the selected on-off pattern.

16. The apparatus according to claim 15, further comprising:
a torque estimator that estimates, as the controlled variable, output torque of the rotary machine based on a current flowing in the rotary machine,
wherein:
the phase calculator calculates the phase of the output voltage vector as a manipulated variable for performing feedback control of the controlled variable to be matched with the request value.

17. The apparatus according to claim 15, wherein:
the controlled variable comprises a first current component and a second current component of a current in the two-phase rotating coordinate system, the current flowing in the rotary machine;
the amplitude calculator calculates the command amplitude of the output voltage vector as a first manipulated variable for performing feedback control of the controlled variable to be matched with the request value; and
the phase calculator calculates the phase of the output voltage vector as a second manipulated variable for performing feedback control of the controlled variable to be matched with the request value.

18. The apparatus according to claim 15, wherein the limiter limits generation of the drive signal by the generator while the apparatus is operating in an over-modulation mode.

* * * * *